United States Patent
Nelson et al.

(10) Patent No.: US 9,304,048 B2
(45) Date of Patent: Apr. 5, 2016

(54) DEVICE FOR EMULATING TEMPERATURE OF AN EXOTHERMIC COMPOSITE STRUCTURE THROUGH A THERMAL CURE CYCLE

(71) Applicant: The Boeing Company, Chicago, IL (US)

(72) Inventors: Karl M. Nelson, Issaquah, WA (US); Scott R. Campbell, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 13/904,363

(22) Filed: May 29, 2013

(65) Prior Publication Data

US 2014/0146855 A1    May 29, 2014

Related U.S. Application Data

(63) Continuation-in-part of application No. 13/684,694, filed on Nov. 26, 2012, now Pat. No. 9,068,894.

(51) Int. Cl.
*G01K 7/02* (2006.01)
*B29C 35/02* (2006.01)

(52) U.S. Cl.
CPC .............. *G01K 7/02* (2013.01); *B29C 35/0288* (2013.01); *Y10T 29/49004* (2015.01); *Y10T 29/49366* (2015.01)

(58) Field of Classification Search
USPC .......... 374/179, 141, 208, 112, 166, 137, 134
See application file for complete search history.

(56) References Cited

U.S. PATENT DOCUMENTS

| | | | |
|---|---|---|---|
| 4,044,600 A | 8/1977 | Claxton et al. | |
| 4,140,050 A | 2/1979 | Giddings | |
| 6,142,662 A * | 11/2000 | Narh ...................... | G01N 25/18 374/29 |
| 6,490,501 B1 | 12/2002 | Saunders | |

FOREIGN PATENT DOCUMENTS

| | | |
|---|---|---|
| EP | 2 105 285 | 9/2009 |
| WO | 97/19325 | 5/1997 |

OTHER PUBLICATIONS

International Preliminary Report on Patentability, PCT/US2013/065223 (2015).
International Search Report and Written Opinion, PCT/US2013/063798 (2014).
International Search Report and Written Opinion, PCT/US2013/065223 (2014).

* cited by examiner

*Primary Examiner* — Mirellys Jagan
(74) *Attorney, Agent, or Firm* — Walters & Wasylyna LLC

(57) ABSTRACT

A temperature emulator may include a stacked assembly including a pair of end plates positioned at an uppermost and lowermost location of the stacked assembly, a plurality of heat sink plates positioned between the pair of end plates, a plurality of shim plates positioned between adjacent pairs of heat sink plates, and an exothermic charge assembly positioned between at least one pair of heat sink plates, the exothermic charge assembly including an exotherm charge configured to react exothermally in response to a thermal cure cycle.

23 Claims, 14 Drawing Sheets

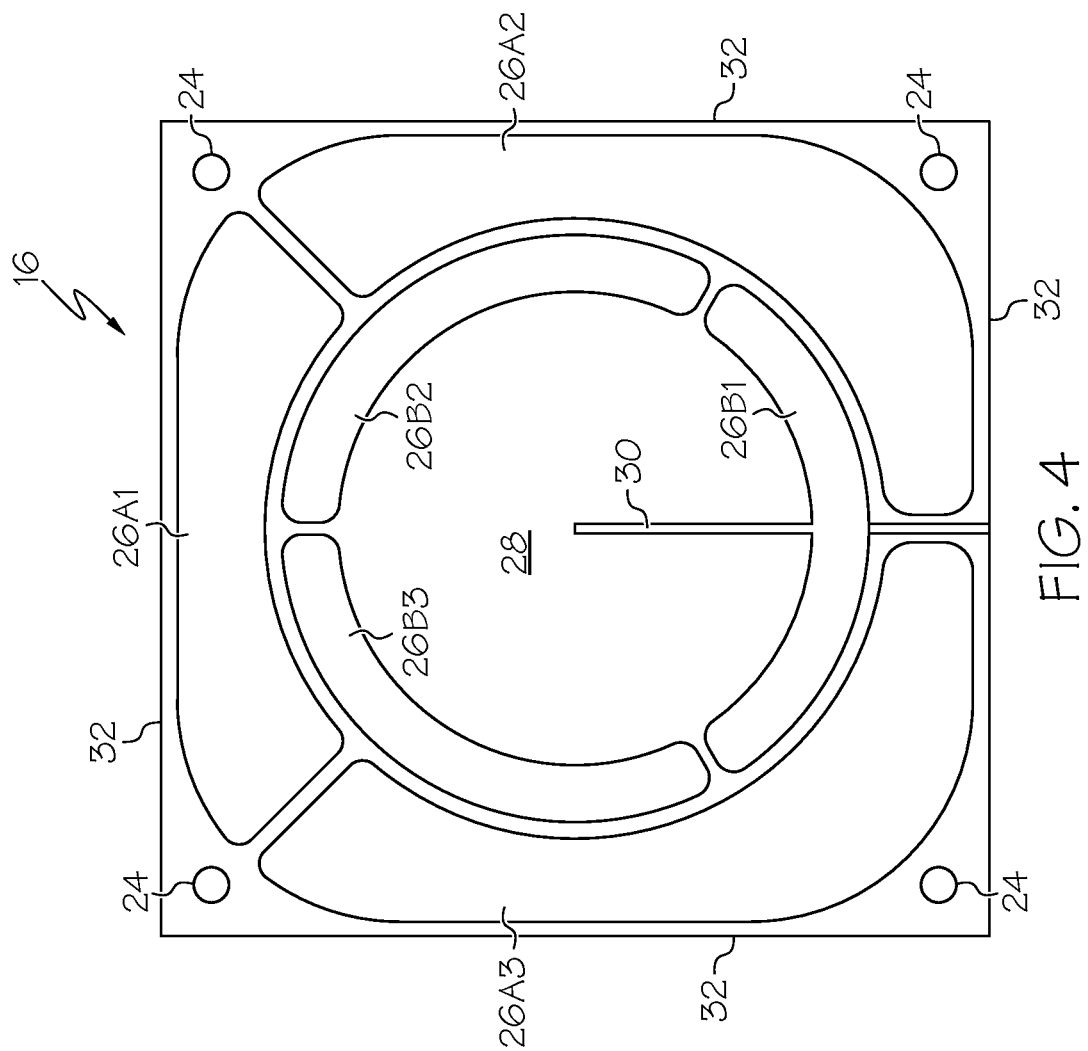

DEVICE FOR EMULATING TEMPERATURE OF AN EXOTHERMIC COMPOSITE STRUCTURE THROUGH A THERMAL CURE CYCLE

PRIORITY

This application is a continuation-in-part of U.S. Ser. No. 13/684,694 (pending) filed on Nov. 26, 2012.

FIELD

The present disclosure is generally related to composite structure production and, more particularly, to a non-contact device for emulating a temperature gradient of a composite part having a significant temperature differential caused by an exothermic reaction through a thermal cure cycle.

BACKGROUND

Autoclave and oven cure processing remains vital to composite structure production. One of the primary goals of the process is to fully cure a pre-impregnated thermoset polymer matrix by initiating and sustaining specific chemical reactions that relate to final resin system cure. The curing of a composite part generally requires accurate monitoring of the temperature of the part throughout the curing process. Manufacturers typically perform a large array of preproduction tests to outline the complex change in viscoelastic properties, which occurs over time and as temperature increases, simplifying it into ramp rates, hold temperatures and dwell, or soak, durations.

In the autoclave, the part is assumed to have reached full cure when certain prescribed time and temperature goals are achieved. Therefore, safety margins must be built into the time and temperature calculations to ensure full cure, and the process must be tightly controlled. Conventional autoclave control systems are hardwired to the equipment and operated by a technician, who must monitor data readouts throughout each cure cycle.

Temperature measurements and controls are typically determined using various temperature sensors placed in or around the parts and a feedback-type algorithm. The temperature sensors, for example thermocouples, may be placed inside an excess or trim region of the part or may be placed on certain locations of the associated tooling or fixtures in close proximity to the part, in order to closely track the temperature of the part throughout the process.

Various disadvantages exist for this method due to the locations of the temperature sensors. The method requires a thermal profile to be calculated, which involves significant trial and error, in order to identify a representative location on the part, and can lead to defects and failure of the part. The thermal profile is used to characterize the part temperatures and match those temperatures at locations that naturally emulate the part temperature and that do not interfere with the process or create a defect in the part. Part failure may result from failure to identify a location that adequately tracks the part temperature. Further, accurate placement of the temperature sensors in the predetermined locations and inspection of each part being fabricated is a time and labor-intensive process. Additionally, locating the temperature sensor inside the trim region of the part requires installation of a sensor for each part being cured, which is costly and may introduce defects into the parts.

Moreover, certain composite parts are exothermic during at least a portion of the autoclave or oven cure process. The exothermic properties of the composite part may affect the temperature and the thermal profile of the composite part during a cure cycle. This exothermic reaction may be substantial depending upon the thickness of the composite part.

Accordingly, those skilled in the art continue with research and development efforts in the field of thermal curing of composite parts.

SUMMARY

In one embodiment, the disclosed temperature emulator may include a plurality of thermally conductive plates configured in a stacked assembly and an exotherm charge disposed between at least one adjacent pair of thermally conductive plates of the plurality of thermally conductive plates.

In another embodiment, the disclosed temperature emulator may include a stacked assembly including a pair of end plates positioned at an uppermost and lowermost location of the stacked assembly, a plurality of heat sink plates positioned between the pair of end plates, a plurality of shim plates positioned between adjacent pairs of the plurality of heat sink plates, and an exothermic charge assembly positioned between at least one pair of heat sink plates, the exothermic charge assembly including an exotherm charge configured to react exothermally in response to a thermal cure cycle.

In yet another embodiment, disclosed is a method of emulating a thermal inertia gradient of an exothermic composite part, the method may include the steps of: (1) providing a pair of end plates, a plurality of heat sink plates each including a plurality of heat sink cutouts, a plurality of shim plates each including a shim cutout, and at least one exotherm charge assembly, (2) assembling the end plates, the heat sink plates, the shim plates, and the exotherm charge assembly into a stacked assembly, wherein adjacent pairs of heat sink plates are separated by at least one shim plate such that a plurality of adjacent heat sink cutouts and shim cutouts form a cavity, (3) introducing thermal insulation within the cavity, (4) introducing an exotherm charge to the exotherm charge assembly, (5) creating a thermal model of the stacked assembly, and (6) identifying a thermal profile of the stacked assembly.

Other embodiments of the disclosed temperature emulator and method of emulating a thermal inertia gradient of an exothermic composite part will become apparent from the following detailed description, the accompanying drawings and the appended claims.

BRIEF DESCRIPTION OF THE DRAWINGS

FIG. 4 is a top plan view of a heat sink plate of the disclosed temperature emulator;

DETAILED DESCRIPTION

Figure 1:
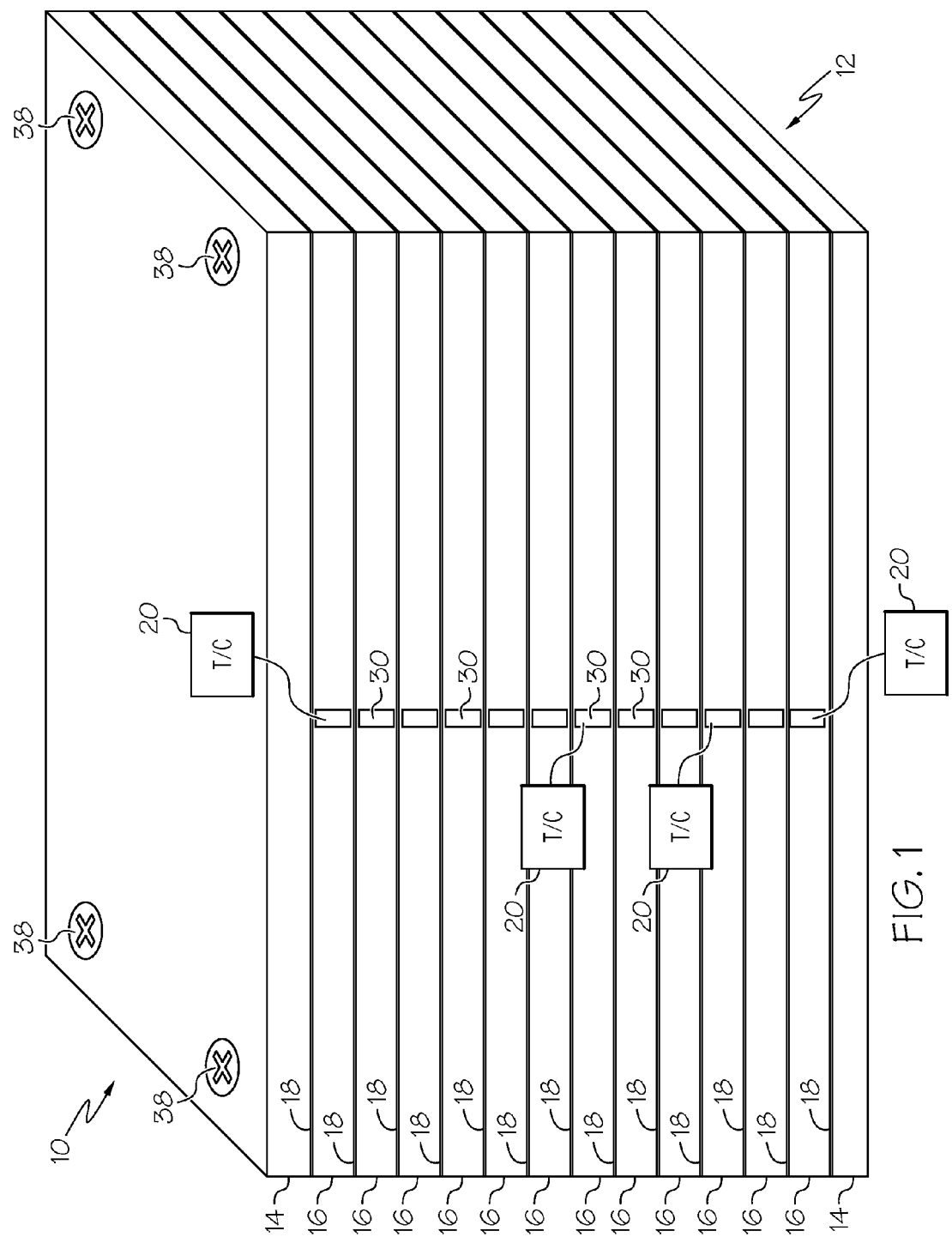
FIG. 1 is a front perspective view of one embodiment of the disclosed temperature emulator.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The disclosed temperature emulator, generally designated 10, may be a passive device (i.e., no electronic or moving parts) that emulates the temperature and/or the exothermic behavior of composite materials and a temperature gradient of a composite part being thermally cured inside an autoclave or oven. The temperature emulator 10 may be referred to throughout the present disclosure generally as emulator, emulator device, or device.

Generally, one or more emulators 10 may be placed into an autoclave or an oven in proximity of a corresponding part being processed (e.g., cured). The emulator 10 may not need to be in direct contact with the part. A control system for the autoclave or oven may use an output from the emulator 10 to regulate the temperature of the part throughout a prescribed thermal cycle by adjusting the parameters of the curing process (e.g., temperature, ramp-up time, or hold time).

Referring to FIG. 1, one embodiment of the disclosed emulator, generally designated 10, may include a stacked assembly 12 having a series of stacked plates, referred to individually as 14, 16, 18. Each plate 14, 16, 18 may be fabricated from a thermally conductive material, such as a metal (e.g., steel) or a thermally conductive non-metal. The emulator 10 may include at least two end plates 14 forming an uppermost and lowermost layer of the stacked assembly 12.

The stacked assembly 12 of the emulator 10 may additionally include a plurality of heat sink plates 16 layered between the uppermost end plate 14 and the lowermost end plate 14. Adjacent (e.g., side by side) pairs of plates 14, 16 may be spaced apart at a predetermined distance and separated by at least one shim plate 18 positioned between adjacent pairs of plates 14, 16 (e.g., between adjacent end plate 14 and heat sink plate 16 or between adjacent heat sink plates 16). As will be described in more detail herein, the shim plates 18 may act as an insulator layer between adjacent pairs of end plates 14 and/or heat sink plates 16.

In an example construction, as shown in FIG. 1, the uppermost end plate 14 may be separated and spaced apart from an adjacent heat sink plate 16 by a shim plate 18. Each heat sink plate 16 may also be separated and spaced apart from an adjacent heat sink plate 16 by a shim plate 18. The lowermost end plate 14 may also be separated and spaced apart from an adjacent heat sink plate 16 by a shim plate 18.

The thickness of the shim plate 18 may be varied to provide for a desired thermal profile of the emulator 10. For example, shim plates 18 having thicknesses of 0.010 inches, 0.060 inches and 0.125 inches may be used to affect the desired spacing of adjacent plates 14, 16. The emulator 10 may be calibrated with the use of thermal models and by spacing the plates 14, 16 a pre-determined distance apart with the shim plates 18.

The emulator 10 may include a plurality of temperature sensors 20 coupled to one or more of the heat sink plates 16. The temperature sensors 20 may lag behind the air temperature within the autoclave or oven by a pre-determined amount in order to match the temperature profile of the composite part throughout the curing process. The temperature sensors 20 may be thermocouples, thermistors, or other suitable temperature sensors.

Thermal models may be used to calibrate the emulator 10 for a desired, or selected, amount of lag time or temperature. The emulator 10 may accommodate for, or replicate, multiple temperature channels, such that both the hottest (e.g., leading) temperature channel and the coldest (e.g., lagging) temperature channel of the part or multiple parts may be emulated. This may allow for relatively quick calibration of any thermal characteristics of the autoclave and tooling used in the curing process.

Figure 2:
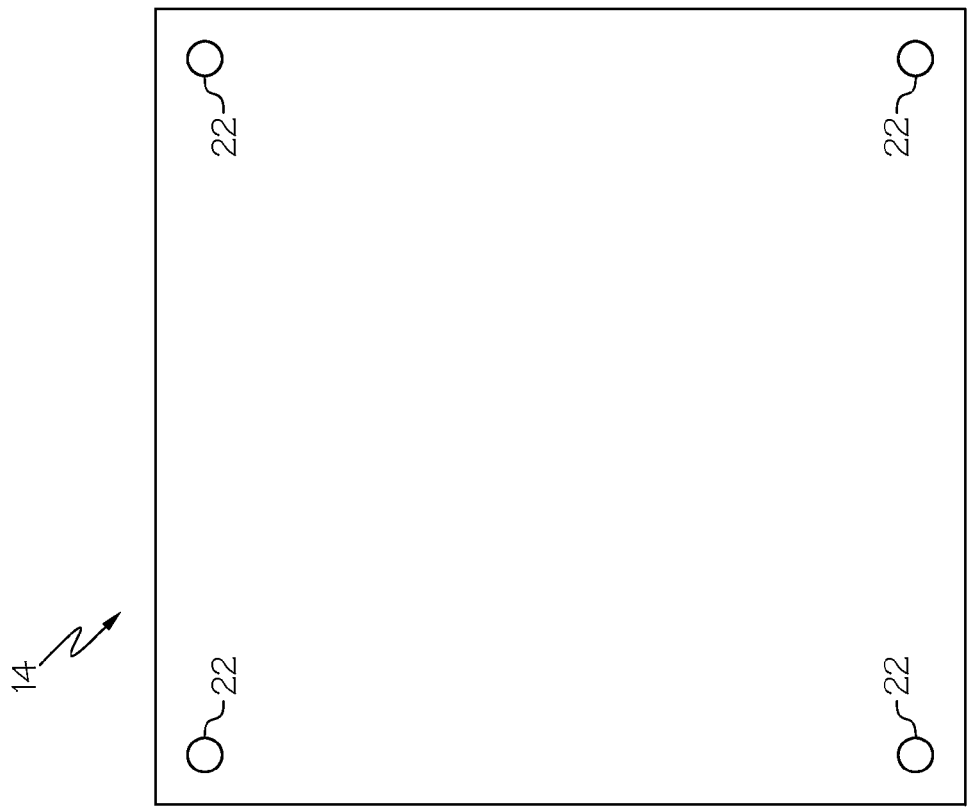
FIG. 2 is a top plan view of an end plate of the disclosed temperature emulator.

Referring to FIG. 2, each end plate 14 may be formed (e.g., cut) from a plate, such as a steel plate. The particular dimensions of the end plates 14 may vary depending on the specific temperature profile desired and type of composite laminate or composite ply being cured. For example, the end plates 14 may be square, rectangular, circular or oblong in plan view, and may have a substantially uniform cross-sectional thickness. In an example construction, the end plates 14 may each be a 15.24 centimeters (6.0 inches) square plate having a thickness of 0.3175 centimeters (0.125 inches). One skilled in the art will appreciate that the overall dimensions of the end plates 14 may vary and is not meant to be limiting in any manner.

Each end plate 14 may also include a plurality of fastening apertures 22. In an example construction, as illustrated, the end plate 14 may include four fastening apertures 22 located about (e.g., near) each corner region.

Referring to FIG. 4, each heat sink plate 16 may be formed (e.g., cut) from a plate, such as a steel plate. The particular dimensions of the heat sink plates 16 may vary depending on the specific temperature profile desired and type of composite laminate or composite ply being cured. For example, the heat sink plates 16 may be square, rectangular, circular or oblong in plan view, and may have a substantially uniform cross-sectional thickness.

In an example construction, the heat sink plates 16 may each be a 15.24 centimeters (6.0 inches) square plate having a thickness of 0.3175 centimeters (0.125 inches), which may match the dimensions of the end plates 14. One skilled in the art will appreciate that the overall dimensions of the heat sink plates 16 may vary and is not meant to be limiting in any manner.

Each heat sink plate 16 may also include a plurality of fastening apertures 24. In an example construction, as illustrated, the heat sink plate 16 may include four fastening apertures 24 located about (e.g., near) each corner region.

Figure 5:
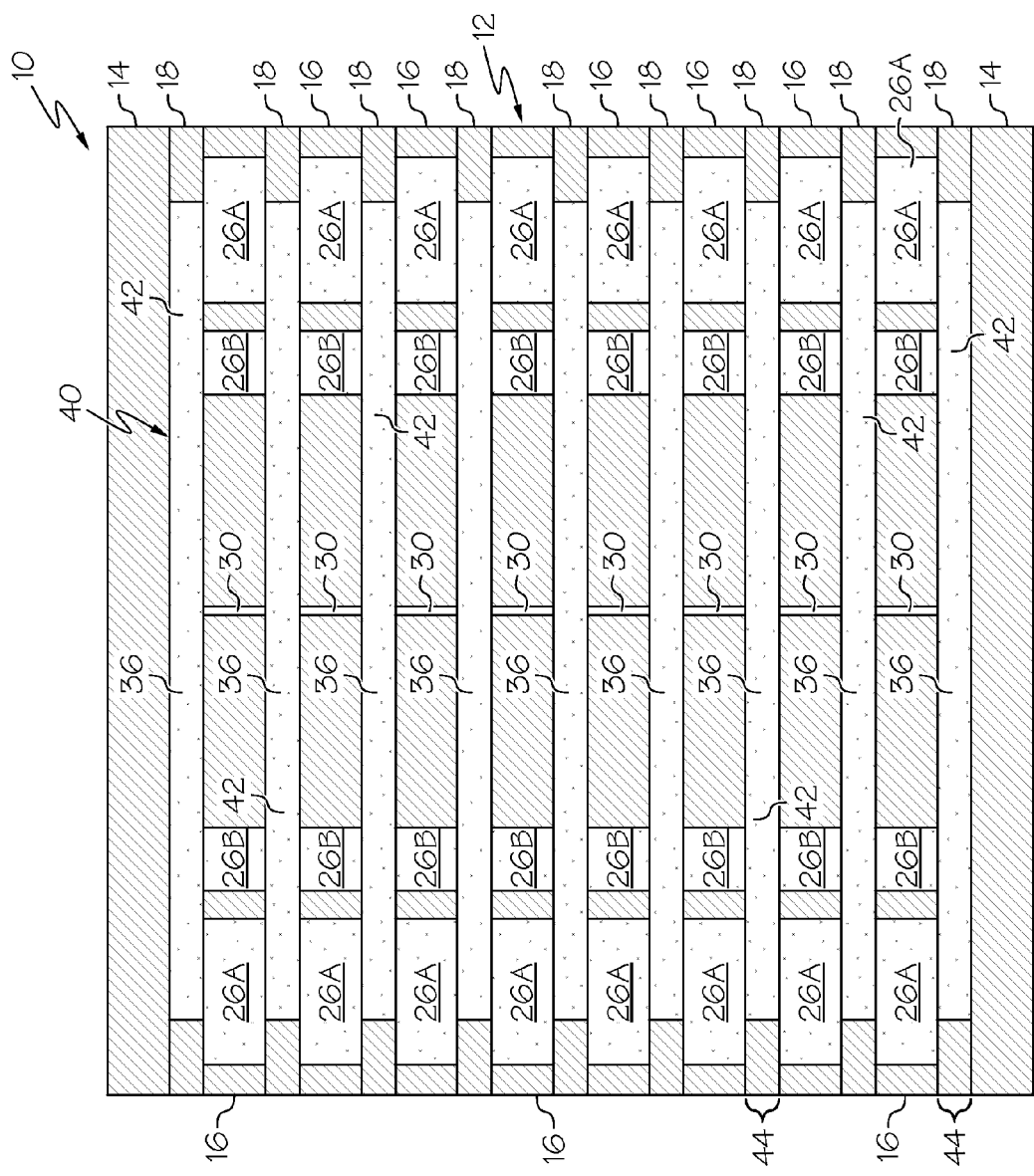
FIG. 5 is a cross-sectional view of the disclosed temperature emulator of FIG. 1.

Each heat sink plate 16 may also include a plurality of cutouts 26A1, 26A2, 26A3, 26B1, 26B2, 26B3. Each cutout 26A1, 26A2, 26A3, 26B1, 26B2, 26B3 may be disposed entirely through the heat sink plate 16. The cutouts 26A1, 26A2, 26A3, 26B1, 26B2, 26B3 may reduce heat transfer within (e.g., through or across) the heat sink plate 16. For example, as is discussed in greater detail below, the cutouts 26A1, 26A2, 26A3, 26B1, 26B2, 26B3 may be filled with thermal insulation 42 (FIG. 5).

The cutouts 26A1, 26A2, 26A3, 26B1, 26B2, 26B3 may be formed, for example, using a water jet cutter. In an example construction, as illustrated, the heat sink plate 16 may include three generally arcuate outer cutouts 26A1, 26A2, 26A3 and three generally arcuate inner cutouts 26B1, 26B2, 26B3. One of the outer cutouts 26A1 may include a radius of approximately ninety degrees and two of the outer cutouts 26A2, 26A3 may include a radius of approximately one hundred thirty-five degrees. Each of the inner cutouts 26B1, 26B2, 26B3 may include a radius of approximately one hundred and twenty degrees. However, one skilled in the art will appreciate that each cutout 26A1, 26A2, 26A3, 26B1, 26B2, 26B3 may include any shape (e.g., arcuate, straight, or angled) and/or size, without limitation.

A center portion 28 of the heat sink plate 16 may be solid and may remain within the inner cutouts 26B1, 26B2, 26B3. In an example construction, the solid center portion 28 may include an approximate diameter of 8.89 centimeters (3.5 inches).

Referring still to FIG. 4, ends of each of the outer cutouts 26A1, 26A2, 26A3 may be separated and spaced away from an end of an adjacent outer cutout 26A1, 26A2, 26A3 by a solid portion of the heat sink plate 16. In an example construction, adjacent ends of adjacent outer cutouts 26A1, 26A2, 26A3 may be separated and spaced apart by an approximately 0.254 centimeter (0.1 inches) wide section of the heat sink plate 16.

Inner sides of each of the outer cutouts 26A1, 26A2, 26A3 may be separated and spaced away from an adjacent outer side of an adjacent inner cutout 26B 1, 26B2, 26B3 by a solid portion of the heat sink plate 16. In an example construction, an inner side of the outer cutout 26A1, 26A2, 26A3 may be separated and spaced apart from an outer side of an adjacent inner cutout 26B1, 26B2, 26B3 by an approximately 0.254 centimeter (0.1 inch) wide section of the heat sink plate 16.

Outer sides of each of the outer cutouts 26A1, 26A2, 26A3 may be separated and spaced away from an adjacent perimeter edge 32 of the heat sink plate 16. In an example construction, an outer side of the outer cutout 26A1, 26A2, 26A3 may be separated and spaced apart from an adjacent perimeter edge 32 of the heat sink plate 16 by an approximately 0.254 centimeter (0.1 inch) wide section of heat sink plate 16.

Ends of each of the inner cutouts 26B1, 26B2, 26B3 may be separated and spaced away from an adjacent end of an adjacent inner cutout 26B1, 26B2, 26B3 by a solid portion of the heat sink plate 16. In an example construction, adjacent ends of adjacent inner cutout 26B1, 26B2, 26B3 may be separated and spaced apart by an approximately 0.254 centimeter (0.1 inches) wide section of the heat sink plate 16.

One skilled in the art will appreciate that the overall number, shape, dimensions, and locations of the cutouts 26A1, 26A2, 26A3, 26B1, 26B2, 26B3 may vary and is not meant to be limiting in any manner.

Referring still to FIG. 4, the heat sink plate 16 may also include a channel 30 extending inwardly from a perimeter edge 32 for insertion, or otherwise coupling, of the temperature sensor 20 to the heat sink plate 16. For example, at least one temperature sensor 20 may be received (e.g., slidably inserted) by a channel 30 of an associated heat sink plate 16. In an example construction, as illustrated, the channel 30 may extend to proximate (e.g., near) a center of the center portion 28 of the heat sink plate 16 and may have a thickness or width of approximately 0.1524 centimeter (0.06 inch). However, one skilled in the art will appreciated that the shape, dimensions, and location of the channels 30 may vary (e.g., may depend on the shape and configuration of the temperature sensor 20) and is not meant to be limiting in any manner.

Figure 3:
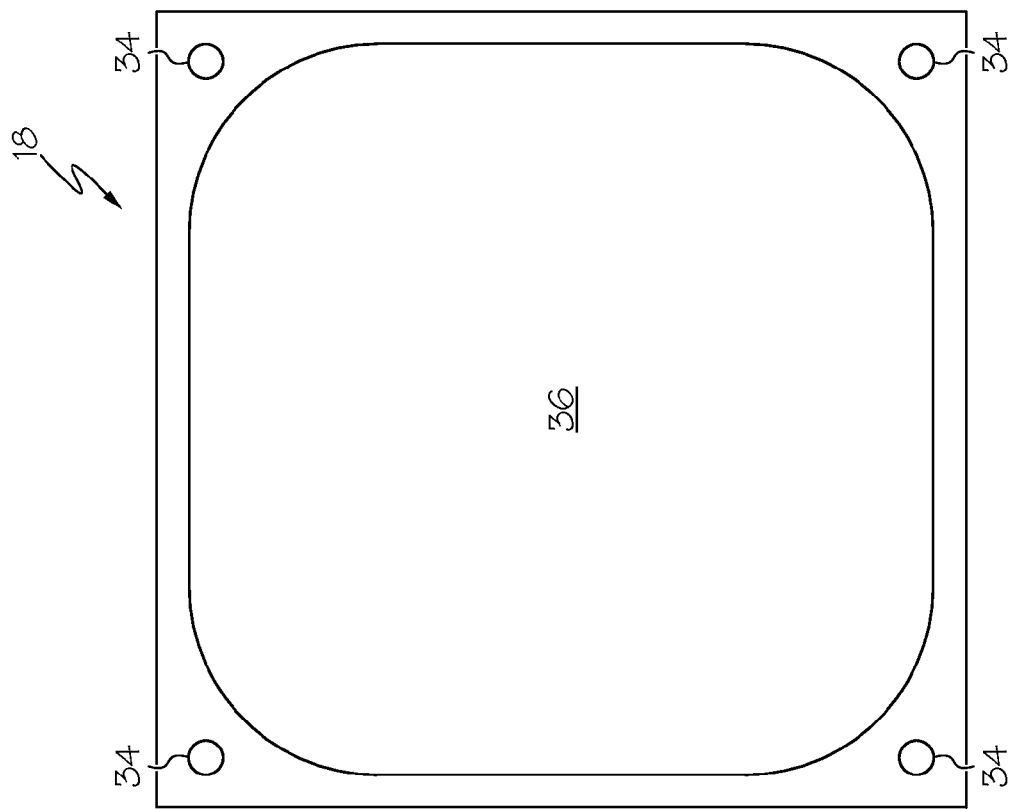
FIG. 3 is a top plan view of a shim plate of the disclosed temperature emulator.

Referring to FIG. 3, each shim plate 18 may be formed (e.g., cut) from a plate, such as a steel plate. The particular dimensions (the overall size and thickness) of the shim plates 18, as well as the size of a central cutout 36 (discussed below), may vary depending on the specific temperature profile desired and type of composite laminate or ply being cured. For example, the shim plates 18 may be square, rectangular, circular or oblong in plan view, and may have a substantially uniform cross-sectional thickness.

In an example construction, the shim plates 18 may be a 15.24 centimeters (6.0 inches) square plate, which may match the exterior dimensions of the end plates 14 and heat sink plates 18. The thickness of the shim plates 18 may vary depending on a specific thermal gradient desired throughout the stacked assembly 12. For example, the stacked assembly 12 may include a plurality of shim plates having varying thicknesses of 0.0254 centimeter (0.010 inch), 0.1524 centimeter (0.060 inch), and 0.3175 centimeter (0.125 inch), however, various other thicknesses are also contemplated.

The spacing between the heat sink plates 16 may be adjusted incrementally by adding or removing shim plates 18 of varying thicknesses. For example, a single relatively thick shim plate 18 may be used to separate adjacent heat sink plates 16. As another example, a plurality of shim plates 18 of different thicknesses may be stacked between adjacent heat sink plates 16 to adjust the spacing and the specific temperature profile desired.

Each shim plate 18 may also include a plurality of fastening apertures 34. In an example construction, as illustrated, the shim plate 18 may include four fastening apertures 34 located about each corner region.

Each shim plate 18 may also include a central cutout 36. The central cutout 36 may be disposed entirely through a central region of the shim plate 18. The central cutout 36 may be formed, for example, using a water-jet cutter. In an example construction, as illustrated, the central cutout 36 may be a (5.25 inches) square opening. However, one skilled in the art will appreciate that the overall dimensions of the central cutout 36 may vary and is not meant to be limiting in any manner.

Referring to FIGS. 1-4, the fastening apertures 22, 24, 34 (FIGS. 2-4) may be aligned when the plates 14, 16, 18 are configured into the stacked assembly 12 (FIG. 1) and may be suitably sized to receive a plurality of fasteners 38 (FIG. 1) configured to securely connect and lock the stacked assembly 12 together. The fastening apertures 22, 24, 34 may include a smooth bore or threaded bore formed entirely through the plates 14, 16, 18. The fasteners 38 may be any suitable mechanical fastener, such as those having a partially or completely threaded shaft. One skilled in the art will appreciate that the plates 14, 16, 18 may be fastened together by other method or technique to form the stacked assembly 12, including being chemically bonded, welded, or the like, without limitation.

Referring to FIG. 5, the stacked assembly 12 of the emulator 10 may include an open cavity 40 defined by the plurality of adjacent cutouts 26A1, 26A2, 26A3, 26B1, 26B2, 26B3, 36 of the stacked combination of heat sink plates 16 and shim plates 18. Thermal insulation 42 may be provided within the cavity 40 (i.e., disposed within the heat sink cutout 26A1, 26A2, 26A3, 26B1, 26B2, 26B3 and shim cutout 36), thus configuring the shim plate 18 filled with thermal insulation 42 into an insulator layer 44.

The thermal insulation 42 may be any suitable thermal insulation material. In one example construction, the thermal insulation 42 may be in the form of a powder insulation, which, due to the fluid nature of powders, may be injected into cavity 40 of the stacked assembly 12 to fill the cutouts 26A1, 26A2, 26A3, 26B1, 26B2, 26B3, 36. The powdered thermal insulation 42 may be formed of a compacted granular structure of silica-based primary particles. As a specific non-limiting example, the thermal insulation 42 may be silica aerogel powder.

In another example construction, the thermal insulation 42 may be in the form of air or any other suitable gas. In still another example construction, the thermal insulation 42 may be in the form of any solid or semi-solid insulator material including, but not limited to, foam, fiberglass batting, fiber batting, wax, spray foam, loose fill material, and the like, without limitation.

The thermal insulation 42 contained within the cavity 40 may allow the emulator 10 to produce accurate and reproducible output results over many autoclave or oven curing cycles.

The plates 14, 16, 18 may themselves be insulated from the surroundings on all sides but one side (i.e., the exterior surface), thus controlling the heat transfer through the stack assembly 12 in a predictable way. In effect, the thermal insulation 42 may essentially surround the center portion 28 of each heat sink plate 16, thus limiting the direction of heat transfer throughout the stacked assembly 12.

Advantageously, the alternating series of heat sink plates 16 and insulator layers 44 (i.e., layers of shim plates 18 having the shim plate cutout 36 filled with thermal insulation 42) may create a stable and well-controlled temperature gradient in a step-wise pattern, which may capture the shape of the lagging temperature sensor curve more accurately than a simple heat sink. Varying the thickness of the shim plate 18 may correspondingly vary the thickness of the insulator layer 44, as the shim plate cutout 36 may accommodate varying amounts of thermal insulation 42.

Thus, lead and lag temperatures of the emulated composite part may be replicated by calibrating the emulator 10. The emulator 10 may be calibrated by adding or subtracting heat sink plates 16 and shim plates 18 from the stacked assembly 12. For example, during a first calibration, a temperature sensor 20 may be coupled to each heat sink plate 16. Following calibration, specific locations on the stack assembly 12 (e.g., particular heat sink plates 18) may be chosen for the coupling of temperature sensors 20. Thermal modeling or other analysis may be used to determine a particular configuration of the stacked assembly 12 after the thermal profile has been identified, such that the emulator 10 may emulate or replicate the thermal inertia gradient of heating of a corresponding composite lamina part independent of part specific thermal monitoring throughout the thermal cycle of the curing process.

Figure 6:
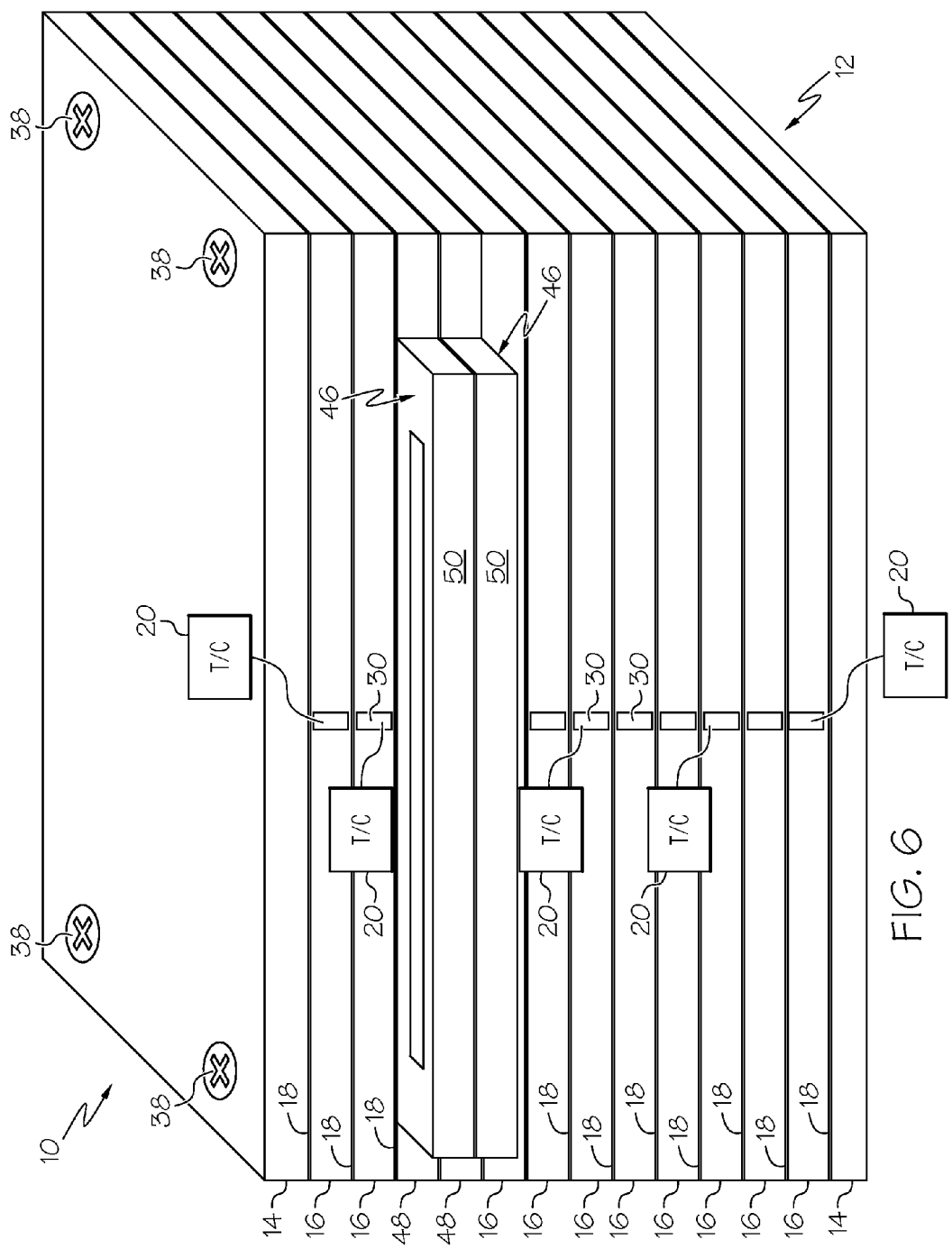
FIG. 6 is a front perspective view of another embodiment of the disclosed temperature emulator.

Referring to FIG. 6, another embodiment of the disclosed emulator 10 may include a stacked assembly 12 having a series of stacked end plates 14, heat sink plates 16, shim plates 18 and at least one exotherm charge assembly 46. The exotherm charge assembly 46 may be positioned (e.g., layered) between at least one adjacent pair of heat sink plates 16.

Addition of at least one exotherm charge assembly 46 may be used to emulate an exothermic event (e.g., exothermic reaction of a composite part during a thermal curing cycle). Thus, the emulator 10 may emulate the thermal inertial gradient of heating of an assembled composite lamina independent of part specific thermal monitoring and while accounting for an exothermic reaction of the curing composite part.

In an example construction, as shown in FIG. 6, the uppermost end plate 14 may be separated and spaced apart from an adjacent heat sink plate 16 by a shim plate 18. Each heat sink plate 16 may also be separated and spaced apart from an adjacent heat sink plate 16 by a shim plate 18. At least one pair of adjacent heat sink plates 16 may be separated and spaced apart by the exotherm charge assembly 46. The lowermost end plate 14 may be separated and spaced apart from an adjacent heat sink plate 16 by a shim plate 18. Other stacked configurations of heat sink plates 16, shim plates 18, and exotherm charge assemblies 46 are also contemplated.

Figure 7:
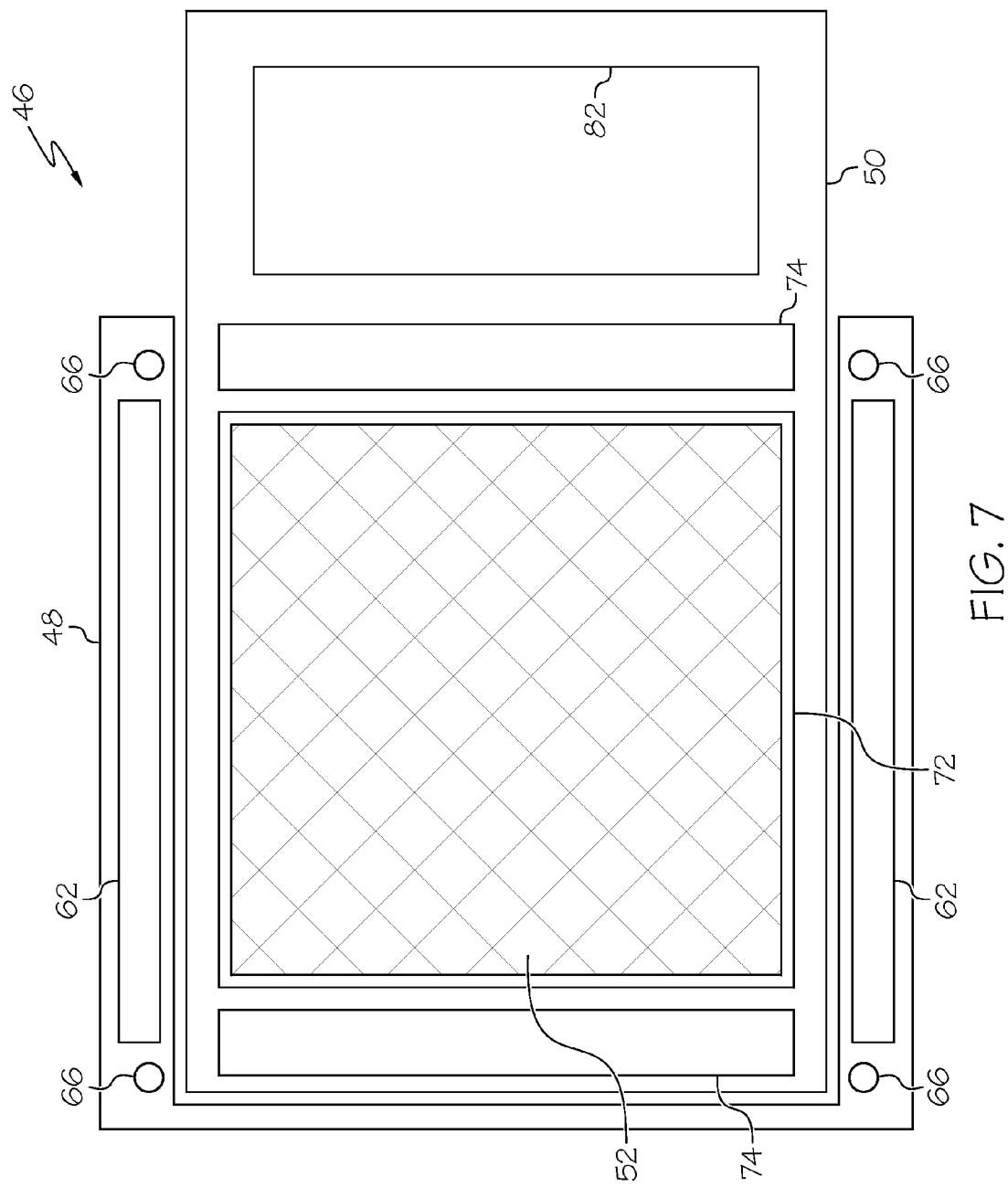
FIG. 7 is a top plan view of an embodiment of an exotherm charge assembly of the disclosed temperature emulator.

Referring to FIG. 7, in an example embodiment, the exotherm charge assembly 46 may include an exotherm plate 48, an exotherm charge plate 50, and an exotherm charge 52. The exotherm plate 48 may be connected between an adjacent pairs of plates (e.g., between adjacent pairs of heat sink plates 16, between adjacent pairs of shim plates 18, or between an adjacent heat sink plate 16 and shim plate 18) as part of the stacked assembly 12 (FIG. 6). The exotherm plate 48 may be configured to receive the exotherm charge plate 50. The exotherm charge plate 50 may be configured to receive and hold the exotherm charge 52.

Figure 8:
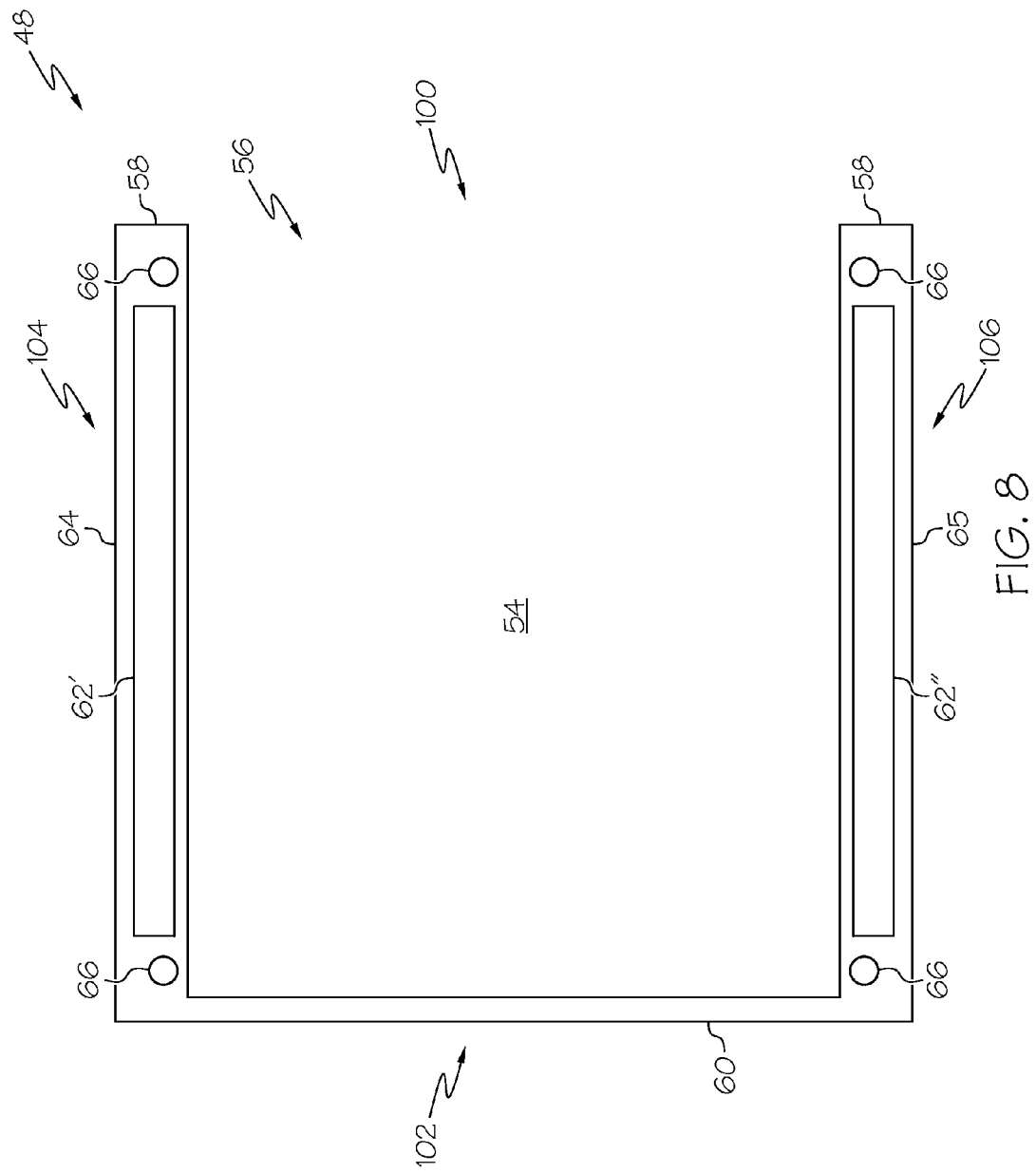
FIG. 8 is a top plan view of an exotherm plate of the exotherm charge assembly of FIG. 7.

Referring to FIG. 8, the exotherm plate 48 may be formed (e.g., cut) from a plate, such as a steel plate. The particular dimensions of the exotherm plate 48 may vary depending on the specific temperature profile desired and type of composite laminate or composite ply being cured. For example, the exotherm plate 48 may be square, rectangular, circular or oblong in plan view, and may have a substantially uniform cross-sectional thickness.

In an example construction, the exotherm plate 48 may be an approximately 15.24 centimeters (6.0 inches) square plate, which may match the dimensions of the end plates 14, having a thickness of 0.3175 centimeters (0.125 inches). One skilled in the art will appreciate that the overall dimensions of the exotherm plate 48 may vary and is not meant to be limiting in any manner.

The exotherm plate 48 may include a central cutout 54 configured to receive at least a portion of the exotherm charge plate 50. The cutout 54 may define an opening 56 at a first perimeter edge 58 (e.g., edge of a first end 100) the exotherm plate 48 and extend to proximate an opposed second perimeter edge 60 (e.g., edge of a second end 102) of the exotherm plate 48. The central cutout 54 may be disposed entirely through the exotherm plate 48. The central cutout 54 and the opening 56 may be suitably sized and shaped to receive at least a portion of the exotherm charge plate 50 (FIG. 7). For example, the central cutout 54 may be square, rectangular, circular or oblong in plan view, and may have a substantially uniform cross-sectional thickness.

The exotherm plate 48 may also include a pair of side cutouts 62. Each side cutout 62 may be disposed between an adjacent internal edge defining the central cutout 54 and a third perimeter edge 64 (e.g., edge of a third end 104) and a fourth perimeter edge 65 (e.g., edge of a fourth end 106) of the exotherm plate 48, respectively. Each side cutout 62 may be disposed entirely through the exotherm plate 48.

Internal edges (e.g., lengthwise edge) defining a first cutout 62' may be separated and spaced away from an adjacent internal edge defining the central cutout 54 and an adjacent third perimeter edge 64 of the exotherm plate 48, respectively, by a solid portion of the exotherm plate 48. Internal edges (e.g., lengthwise edge) defining a second cutout 62" may be separated and spaced away from an adjacent internal edge defining the central cutout 54 and an adjacent fourth perimeter edge 65 of the exotherm plate 48, respectively, by a solid portion of the exotherm plate 48.

In an example construction, each side cutout 62 may be an elongated (e.g., rectangular) through-aperture extending from proximate the first perimeter edge 58 to proximate the second perimeter edge 58 of the exotherm plate 48. For example, each side cutout 62 may be suitably sized (e.g., lengthwise) to substantially match an adjacent internal edge defining the cutout 54.

Figure 12:
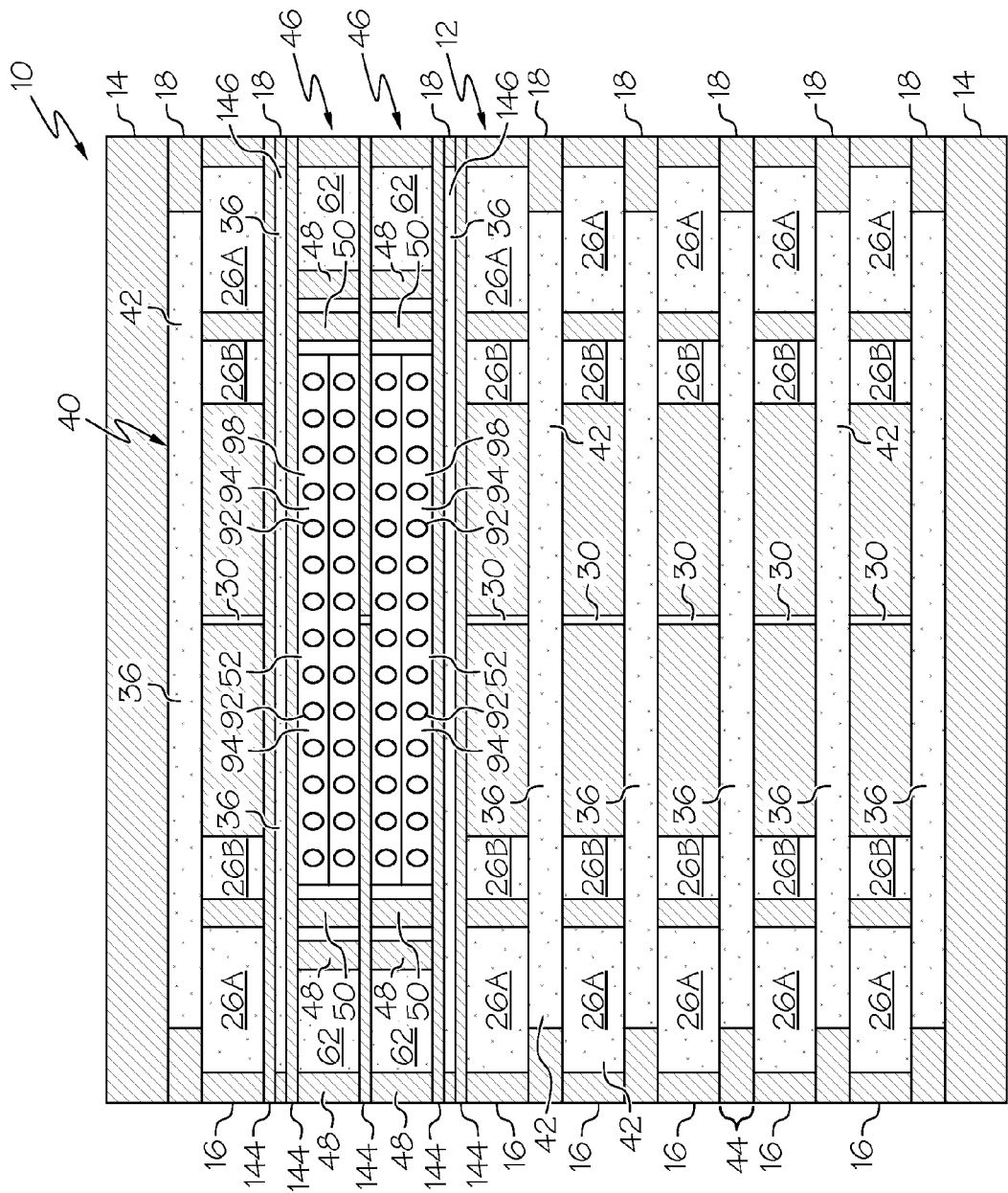
FIG. 12 is a cross-sectional view of an embodiment of the disclosed temperature emulator of FIG. 6.

The side cutouts 62 may reduce heat transfer within (e.g., through or across) the exotherm plate 48. For example, as is discussed in greater detail below, the side cutouts 62 may be filled with thermal insulation 42 (FIG. 12).

The cutouts 54, 62 of the exotherm plate 48 may be formed, for example, using a water-jet cutter. In an example construction, as illustrated, the central cutout 54 may be generally rectangular-shaped having dimensions of approximately 14.808 centimeters (5.83 inches) by 12.319 centimeters (4.85 inches). The opening 56 may be approximately 12.319 centimeters (4.85 inches) wide. Each of the side cutouts 62 may be approximately 12.065 centimeters (4.75 inches) by 0.838 centimeter (0.33 inch).

One skilled in the art will appreciate that the overall number, shape, dimensions, and locations of the cutouts 54, 62 may vary and is not meant to be limiting in any manner.

The exotherm plate 48 may also include a plurality of fastening apertures 66. In an example construction, as illustrated, the exotherm plate 48 may include four fastening apertures 66 located about (e.g., near) each corner region.

Figure 9:
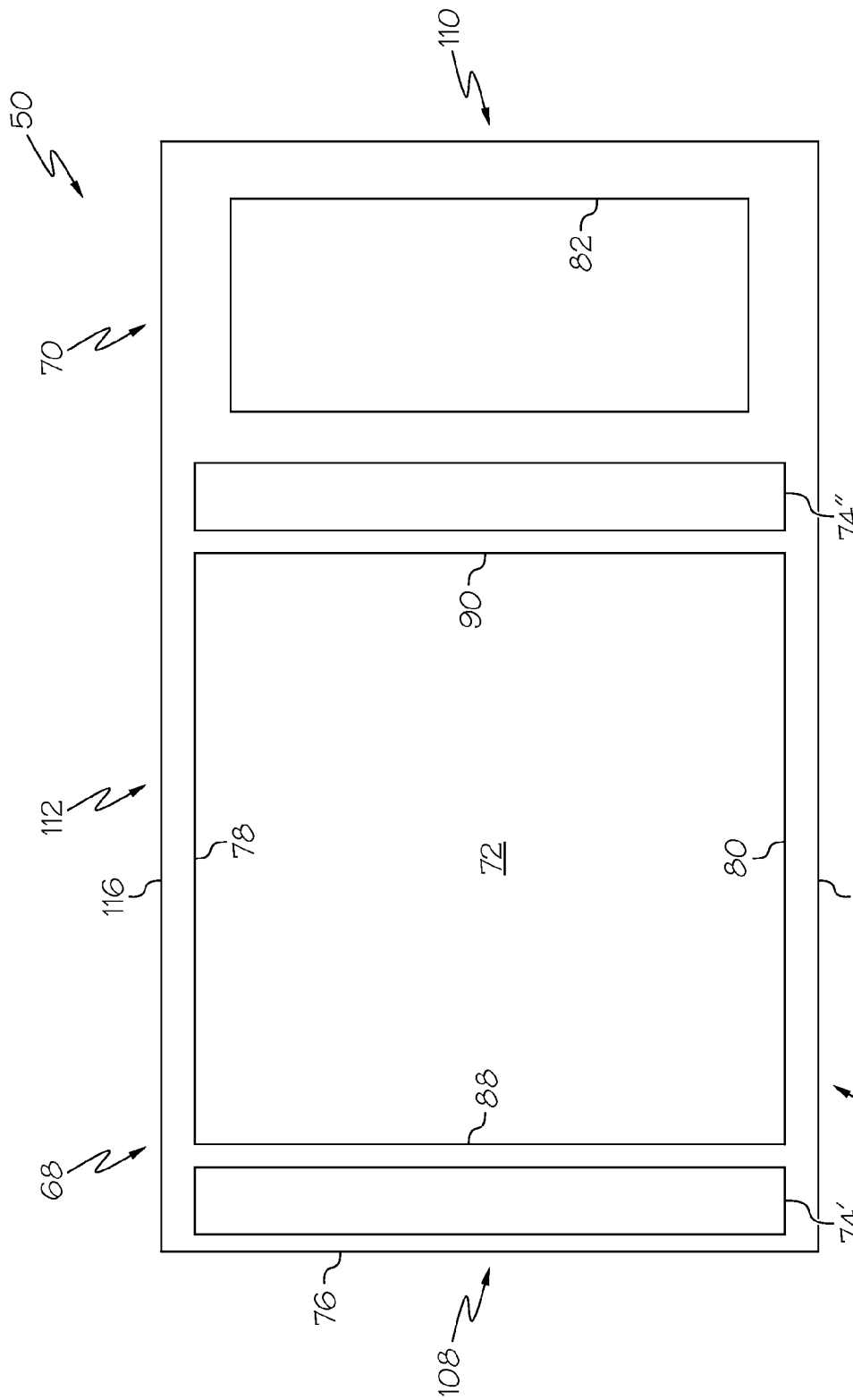
FIG. 9 is a is a top plan view of an exotherm charge plate of the exotherm charge assembly of FIG. 7.

Referring to FIG. 9, the exotherm charge plate 50 may be formed (e.g., cut) from a plate, such as a steel plate. The particular dimensions of the exotherm charge plate 50 may vary depending on the specific temperature profile desired and type of composite laminate or composite ply being cured. For example, the exotherm charge plate 50 may be square, rectangular, circular or oblong in plan view, and may have a substantially uniform cross-sectional thickness. The exotherm charge plate 50 may include a charge holder portion 68 about a first end 108 and a grip portion 70 about a second end 110. The charge holder portion 68 of the exotherm charge plate 50 may be suitably sized and shaped to be received within the cutout 54 of the exotherm plate 48 through the opening 56 (FIG. 8).

In an example construction, the exotherm charge plate 50 may be an approximately 20.32 centimeters (8.0 inches) by 12.065 centimeters (4.75 inches) rectangular plate having a thickness of 0.3175 centimeters (0.125 inches). The charge holder portion 68 may be an approximately 15.24 centimeters (6.0 inches) inches by 12.065 centimeters (4.75 inches) rectangular section of the exotherm charge plate 50 which may match the dimensions of the central cutout 54 of the exotherm plate 48. The grip portion 70 may be an approximately 5.08 centimeters (2.0 inches) inches by 12.065 centimeters (4.75 inches) rectangular section of the exotherm charge plate 50 configured to extend outwardly from the stacked assembly 12 (FIG. 6) upon insertion of the exotherm charge plate 50 into the exotherm plate 48. One skilled in the art will appreciate that the overall dimensions of the exotherm charge plate 50 may vary and is not meant to be limiting in any manner.

The exotherm charge plate 50 may include a charge cutout 72 configured to receive the exotherm charge 52 (FIG. 7). The charge cutout 72 may be disposed about a central region of the charge holder portion 68 of the exotherm charge plate 50. The charge cutout 72 may be disposed entirely through the exotherm charge plate 50. The charge cutout 72 may be suitably sized and shaped to receive and bound the entirety of the exotherm charge 52. For example, the charge cutout 72 may be square, rectangular, circular or oblong in plan view, and may have a substantially uniform cross-sectional thickness.

The exotherm charge plate 50 may also include a pair of side cutouts 74 disposed through the charge holder portion 68. A first side cutout 74 may be disposed between an adjacent internal edge defining the charge cutout 72 and a first perimeter edge 76 (e.g., edge of the first end 108) and a second side cutout 74 may be disposed between an adjacent opposing internal edge defining the charge cutout 72 and an internal edge defining a grip cutout 82. Each side cutout 74 may be disposed entirely through the exotherm charge plate 50.

In an example construction, each side cutout 74 may be an elongated (e.g., rectangular) through-aperture extending from proximate a third perimeter edge 116 (e.g., edge of a third end 112) to proximate a fourth perimeter edge 118 (e.g., edge of a fourth end 114) of the exotherm charge plate 50. For example, each side cutout 74 may be suitably sized (e.g., lengthwise) to substantially match an adjacent internal edge defining the cutout 72.

The side cutouts 74 may reduce heat transfer within (e.g., through or across) the exotherm charge plate 50. For example, as is discussed in greater detail below, the cutouts 74 may be filled with thermal insulation 42 (FIG. 12).

The exotherm charge plate 50 may also include a grip cutout 82 disposed through the grip portion 70. The grip cutout 82 may be disposed between a second perimeter edge 84 (e.g., edge of the second end 110) and the charge holder portion 68 (e.g., an adjacent internal edge defining the second side cutout 74) of the exotherm charge plate 50. The grip cutout 82 may be disposed entirely through the exotherm charge plate 50.

The cutouts 72, 74, 82 of the exotherm charge plate 50 may be formed, for example, using a water jet cutter. In an example construction, as illustrated, the charge cutout 72 may be generally square-shaped having dimensions of approximately 10.795 centimeters (4.25 inches) by 10.795 centimeters (4.25 inches). Each of the side cutouts 74 may be approximately 10.795 centimeters (4.25 inches) by 1.27 centimeters (0.5 inch). The grip cutout 82 may be approximately 9.525 centimeters (3.75 inches) by 3.81 centimeters (1.5 inches).

One skilled in the art will appreciate that the overall number, shape, dimensions, and locations of the cutouts 72, 74, 82 may vary and is not meant to be limiting in any manner.

Edges of each of the cutouts 72, 74, 82 may be separated and spaced away from an internal edge defining an adjacent cutout 72, 74, 82 and an adjacent perimeter edge of the exotherm charge plate 50 by a solid portion of the exotherm charge plate 50.

In an example construction, an internal edge (e.g., long edge) defining the first side cutout 74' may be separated and spaced away from an adjacent first perimeter edge 76 of the exotherm charge plate 50 by an approximately 0.3175 centimeter (0.125 inch) wide section of exotherm charge plate 50. An opposing internal edge (e.g., lengthwise edge) of the first side cutout 74' may be separated and spaced away from an adjacent internal edge defining the charge cutout 74' by an approximately 0.3175 centimeter (0.125 inch) wide section of exotherm charge plate 50.

An internal edge (e.g., lengthwise edge) defining the second side cutout 74" may be separated and spaced away from an adjacent internal edge defining the charge cutout 72 by an approximately 0.3175 centimeter (0.125 inch) wide section of exotherm charge plate 50. An opposing internal edge (e.g., lengthwise edge) of the second side cutout 74" may be separated and spaced away from an adjacent internal edge defining the grip cutout 82 by an approximately 0.635 centimeter (0.25 inch) wide section of exotherm charge plate 50.

Each internal edge (e.g., short edge) defining the side cutouts 72 may be separated and spaced away from an adjacent perimeter edge 116, 118 of the exotherm charge plate 50 by an approximately 0.635 centimeter (0.25 inch) wide section of exotherm charge plate 50. Each internal edge defining the charge cutout 72 may be separated and spaced away from an adjacent perimeter edge 116, 118 of the exotherm charge plate 50 by an approximately 0.635 centimeter (0.25 inch) wide section of exotherm charge plate 50.

Referring again to FIG. 7, the side cutouts 62 of the exotherm plate 48 and the side cutouts 74 of the exotherm charge plate 50 may be arranged to surround the cutout 72 and the exotherm charge 52 upon the exotherm charge plate 50 being inserted into the exotherm plate 48. In an example construction, as illustrated, the side cutouts 62 of the exotherm plate 48 may be positioned generally parallel to first 78 and second 80 (FIG. 9) internal edges defining the charge cutout 72. The side cutouts 74 of the exotherm charge plate 50 may be positioned generally parallel to third 88 and fourth 90 (FIG. 9) internal edges defining the charge cutout 72.

Figure 10:
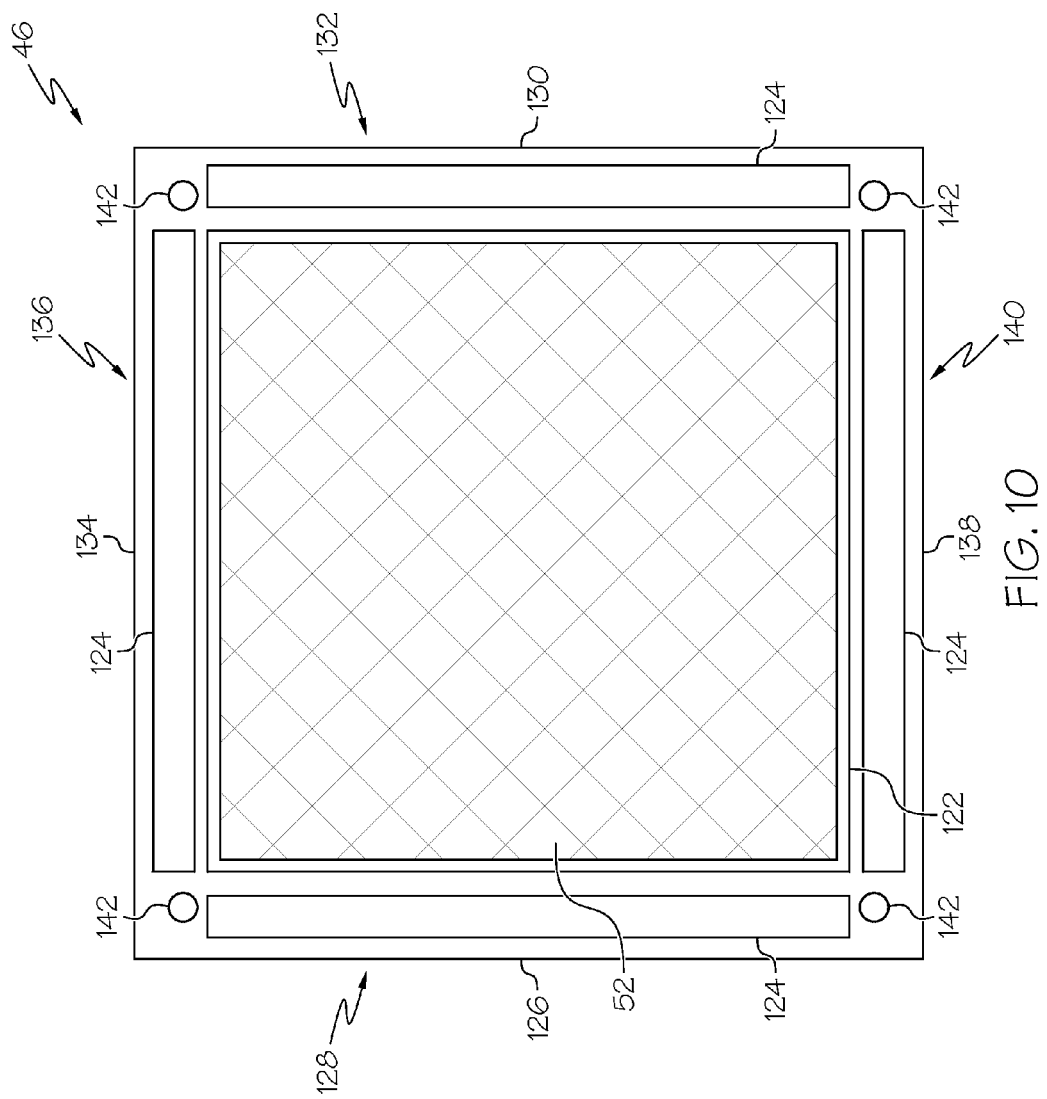
FIG. 10 is a top plan view of another embodiment of an exotherm charge assembly of the disclosed temperature emulator.

Referring to FIG. 10, in another example embodiment, the exotherm charge assembly 46 may include an exotherm plate 120 and an exotherm charge 52. The exotherm plate 48 may be connected between an adjacent pairs of plates (e.g., between adjacent pairs of heat sink plates 16, between adjacent pairs of shim plates 18, or between an adjacent heat sink plate 16 and shim plate 18) as part of the stacked assembly 12 (FIG. 6). The exotherm plate 120 may be configured to receive and hold the exotherm charge 52.

The exotherm plate 120 may be formed (e.g., cut) from a plate, such as a steel plate. The particular dimensions of the exotherm plate 120 may vary depending on the specific temperature profile desired and type of composite laminate or composite ply being cured. For example, the exotherm plate 120 may be square, rectangular, circular or oblong in plan view, and may have a substantially uniform cross-sectional thickness.

In an example construction, the exotherm plate 120 may be an approximately 15.24 centimeters (6.0 inches) square plate, which may match the dimensions of the end plates 14, having a thickness of 0.3175 centimeters (0.125 inches). One skilled in the art will appreciate that the overall dimensions of the exotherm plate 120 may vary and is not meant to be limiting in any manner.

The exotherm plate 120 may include a charge cutout 122 configured to receive the exotherm charge 52 (FIG. 7). The charge cutout 120 may be disposed about a central region of the exotherm plate 120. The charge cutout 122 may be disposed entirely through the exotherm plate 120. The cutout 122 may be suitably sized and shaped to receive and bound the entirety of the exotherm charge 52. For example, the cutout 122 may be square, rectangular, circular or oblong in plan view, and may have a substantially uniform cross-sectional thickness.

The exotherm plate 120 may also include a four side cutouts 124. Each side cutout 124 may be disposed between an adjacent internal edge defining the charge cutout 124 and a first perimeter edge 126 (e.g., edge of a first end 128), a second perimeter edge 130 (e.g., edge of a second end 132), a third perimeter edge 134 (e.g., edge of a third end 136), and a fourth perimeter edge 138 (e.g., edge of a fourth end 140) of the exotherm plate 120, respectively. Each side cutout 124 may be disposed entirely through the exotherm plate 120.

Internal edges defining the side cutout 124 may be separated and spaced away from an adjacent internal edge defining the charge cutout 122 and an adjacent perimeter edge of the exotherm plate 120 by a solid portion of the exotherm plate 120.

In an example construction, each side cutout 124 may be an elongated (e.g., rectangular) through-aperture extending from proximate a perimeter edge to proximate an opposing perimeter edge of the exotherm plate 122. For example, each side cutout 124 may be suitably sized (e.g., lengthwise) to substantially match an adjacent internal edge defining the cutout 122.

Figure 13:
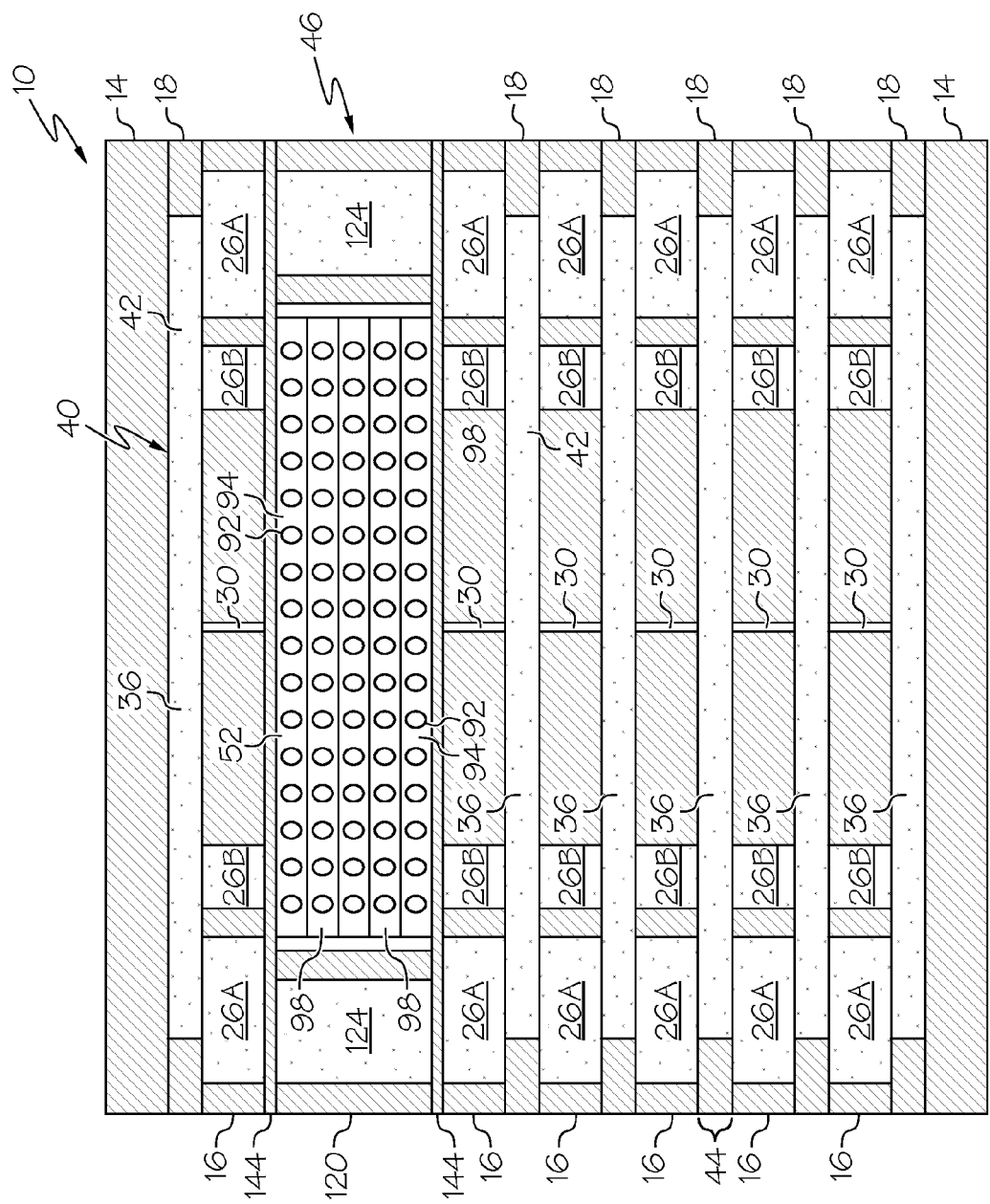
FIG. 13 is a cross-sectional view of another embodiment of the disclosed temperature emulator of FIG. 6.

The side cutouts 124 may reduce heat transfer within (e.g., through or across) the exotherm plate 120. For example, as is discussed in greater detail below, the side cutouts 124 may be filled with thermal insulation 42 (FIG. 13).

The cutouts 122, 124 of the exotherm plate 120 may be formed, for example, using a water jet cutter. In an example construction, as illustrated, the charge cutout 122 may be generally square-shaped having dimensions of approximately 12.065 centimeters (4.75 inches) by 12.065 centimeters (4.75 inches). Each of the side cutouts 62 may be approximately 12.065 centimeters (4.75 inches) by 0.838 centimeter (0.33 inch).

One skilled in the art will appreciate that the overall number, shape, dimensions, and locations of the cutouts 122, 124 may vary and is not meant to be limiting in any manner.

The exotherm plate 120 may also include a plurality of fastening apertures 142. In an example construction, as illustrated, the exotherm plate 120 may include four fastening apertures 142 located about (e.g., near) each corner region.

Referring to FIGS. 7, 10, 12 and 13, the exotherm charge 52 may be any pre-plied lay-up of uncured composite material 96. The uncured composite material 96 of the exotherm charge 52 may include a reinforcement material 92 and a matrix material 94. The reinforcement material 92 may be any material suitable to reinforce (e.g., strengthen or stiffen) a composite part. For example, the reinforcement material may include, but is not limited to, particles, continuous or discontinuous fibers (e.g., carbon, boron, glass, or aramid), mats, and fabrics (e.g., woven, stitched, or braided). The matrix material 94 may be any material suitable to bind the reinforcing material 92 and transfer stress between reinforcing materials.

For example, the matrix material 94 may include, but is not limited to, a thermoset resin (e.g., polyesters, epoxies, vinyl esters, or phenolics) and a thermoplastic resin. One skilled in the art can appreciate additional constituent materials, fillers, modifiers, or additives may also be used to form the exotherm charge 52, such as toughening agents, interlayer-tougheners, catalysts, release agents, or the like.

The composite material 96 forming the exotherm charge 52 may include at least two plies or lamina 98 (two plies are shown for each exotherm charge 52 in FIG. 12 and five plies are shown in FIG. 13). The exotherm charge 52 may include a unidirectional reinforcing material (e.g., fibers) or a bidirectional reinforcing material (e.g., woven fabric). The exotherm charge 52 may include a plurality of stacked plies 98 forming a laminate composite body.

The overall thickness of the exotherm charge 52 may not be equal to the thickness of the composite part being thermally cured inside an autoclave or oven. For example, the thickness (e.g., number of plies 98) of the exotherm charge 52 may be only a fraction of the overall thickness (e.g., number of plies) of the composite part.

In an example implementation, the composite material 96 forming the exotherm charge 52 may be a prepreg composite where each ply 98 may include reinforcing material 92 that is pre-impregnated with matrix material 94. In another example implementation, the composite material 96 forming the exotherm charge 52 may be a wet lay-up composite where matrix material 94 is transferred to each ply 98 or to a plurality of plies 98 of reinforcing material 92.

The exotherm charge 52 may be sized and shaped to fit entirely within the charge cutout 72 of the exotherm charge plate 50 or the charge cutout 122 of the exotherm plate 120. For example, the exotherm charge 52 may be an approximately 10.16 centimeters (4 inches) square piece of composite material 96. The exotherm charge 52 may include composite material 96 substantially the same as the composite material forming the composite part for which a thermal profile is to be emulated.

Referring still to FIG. 12, an example construction of the stacked assembly 12 of the emulator 10 may include an open cavity 40 defined by the plurality of adjacent cutouts 26A1, 26A2, 26A3, 26B1, 26B2, 26B3, 36, 62, 74 of the stacked combination of heat sink plates 16, shim plates 18, exotherm plate 48, and exotherm charge plate 50. Thermal insulation 42 (e.g., powdered insulation or air) may be provided within the cavity 40 (i.e., disposed within the heat sink cutouts 26A1, 26A2, 26A3, 26B1, 26B2, 26B3, the shim cutouts 36, the exotherm plate side cutouts 62, and the exotherm charge plate side cutouts 74), thus configuring the shim plates 18 filled with thermal insulation 42 into an insulator layer 44.

As illustrated in FIG. 12, at least one exotherm charge assembly 46 (two are shown) may be configured within the stacked assembly 12. The exotherm charge assembly 46 may be located at any position within the stacked assembly 12 and the exotherm plate 48 may be positioned adjacent to either a heat sink plate 16 or a shim plate 18 on either side depending upon the final configuration of the stacked assembly 12 based upon the thermal profile desired.

One skilled in the art will appreciate that varying the number of exotherm charge assemblies 46 or by varying the thickness of the exotherm charge assembly 46, an overall thicker (e.g., more plies) composite material exotherm charge 52 may be utilized.

A separator plate 144 may be disposed above and below each exotherm charge assembly 46 (e.g., between the exotherm plate 48 and an adjacent heat sink plate 16 or shim plate 18). The separator plate 144 may close off at least a portion of the cavity 40 such that insulation 42 (e.g., powdered insulation) does not enter the cutout 54 of the exotherm plate 48 or interfere with installation of the exotherm charge plate 50 into exotherm plate 48 (e.g., insertion via the opening 56) (FIG. 8) and does not enter the cutout 72 of the exotherm charge plate or interfere with the exotherm charge 52 (FIG. 7).

Thus, in an assembled stacked assembly 12, as illustrated in FIG. 12, the thermal insulation 42 disposed within cutouts 26A1, 26A2, 26A3, 26B1, 26B2, 26B3, 36 of the heat sink plates 16 and shim plates 18 may be powdered insulation and the thermal insulation 42 disposed within cutouts 62, 74 of the exotherm plate 48 and exotherm charge plate 50 may be air.

A separator plate 144 may optionally be disposed between adjacent exotherm charge assemblies 46 (e.g., positioned between adjacent exotherm plates 48). Additionally, adjacent pairs of separator plates 144 may be optionally be separated and spaced apart by a shim plate 18. The cutout 36 of the shim plate 18 may define a thermal gap 146 between adjacent separator plates 144. The thermal gap 146 may be filled with thermal insulation 42 (e.g., powdered insulation or air).

Figure 11:
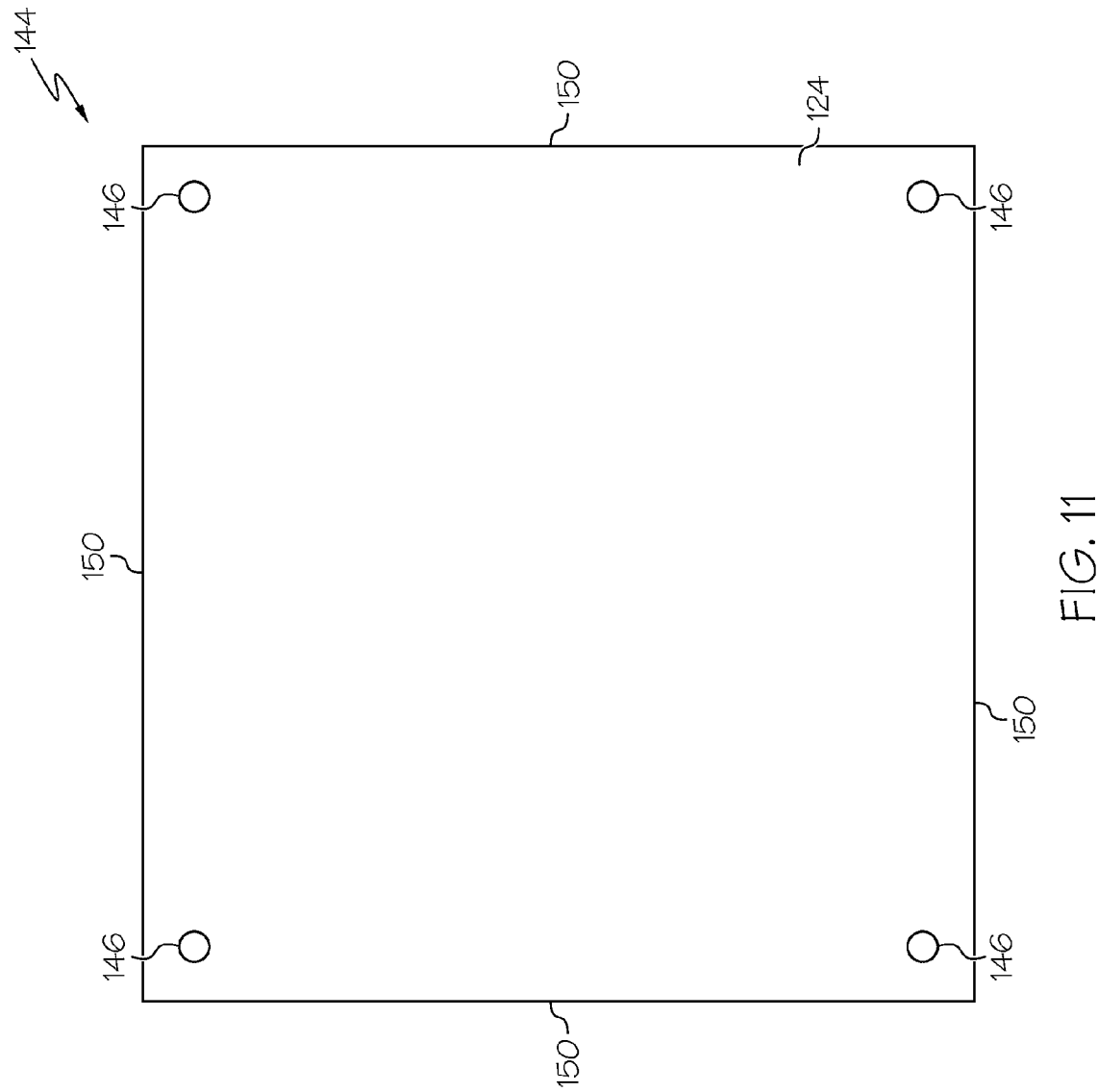
FIG. 11 is a top plan view of a separator plate of the disclosed temperature emulator.

Referring to FIG. 11, the separator plate 144 may be formed (e.g., cut) from a solid plate, such as a steel plate, a fiberglass plate, or other non-metallic material. The particular dimensions of the separator plate 144 may vary depending on the specific temperature profile desired and type of composite laminate or composite ply being cured. For example, the separator plate 144 may be square, rectangular, circular or oblong in plan view, and may have a substantially uniform cross-sectional thickness.

In an example construction, the separator plate 144 may each be a 15.24 centimeters (6.0 inches) square plate having a thickness of between approximately 0.127 millimeters (0.005 inch) and 0.508 millimeters (0.020 inch). In another example construction, the separator plate 144 may have a thickness of approximately 0.254 millimeters (0.010 inch). One skilled in the art will appreciate that the overall dimensions of the separator plate 144 may vary and is not meant to be limiting in any manner.

Each separator plate 144 may also include a plurality of fastening apertures 146. In an example construction, as illustrated, the separator plate 144 may include four fastening apertures 146 located about (e.g., near) each corner region.

A temperature sensor 20 may be coupled to a heat sink plate 16 (e.g., received by the channel 30) adjacent to the separator plate 144 and positioned proximate to a surface of the separator plate 144. For example, a temperature sensor 20 (e.g., thermocouple) may be threaded through the channel 30 of a heat sink plate 16 directly adjacent to the separator plate 144. The temperature sensor 20 may be bonded or otherwise connected to a major surface of the separator plate 144 (e.g., the major surface of the separator plate 144 opposite the exotherm charge 52).

Optionally, the separator plate 144 may also include a channel extending inwardly from a perimeter edge 150 for insertion, or otherwise coupling, of a temperature sensor 20 to the separator plate 144. For example, at least one temperature sensor 20 may be received (e.g., slidably inserted) by a channel of an associated separator plate 144. The channel may be disposed between major surfaces of the separator plate 144 and may not extend entirely therethrough in order to prevent thermal insulation 42 (e.g., powdered insulation) from leaking between layers of the stacked assembly 12. In an example construction, the channel may extend to proximate (e.g., near) a center of the separator plate 144 and may have a thickness or width of approximately 0.1524 centimeter (0.06 inch). However, one skilled in the art will appreciated that the shape, dimensions, and location of the channels may vary (e.g., may depend on the shape and configuration of the temperature sensor 20) and is not meant to be limiting in any manner.

The exotherm charge assembly 46 may be insulated from the surroundings on all sides but one side (i.e., the exterior surface), thus controlling the heat transfer through the stacked assembly 12 in a predictable way. In effect, the thermal insulation 42 may essentially surround the exotherm charge 52 of exotherm charge assembly 46, thus limiting the direction of heat transfer throughout the stacked assembly 12.

As expressed above, the alternating series of heat sink plates 16, insulator layers 44 (i.e., layers of shim plates 18 having the shim plate cutout 36 filled with thermal insulation 42), and at least one exotherm charge assembly 46 (two are shown in FIG. 12) may create a stable and well-controlled temperature gradient in a step-wise pattern, which may capture the shape of the lagging temperature sensor curve accounting for the exothermic reaction of the exotherm charge 52 during the thermal cure cycle.

Varying the thickness of the shim plate 18 may correspondingly vary the thickness of the insulator layer 44, as the shim plate cutout 36 may accommodate varying amounts of thermal insulation 42. Varying the thickness of the exotherm charge assembly 46 (e.g., by varying the thicknesses of the exotherm plate 48, the exotherm charge plate 50, and the exotherm charge 52) may provide for varying amounts of heat generated due to the exothermic cure reaction. Varying number of exotherm charge assemblies 46 may provide for varying amounts of heat generated due to the exothermic cure reaction.

Thus, lead and lag temperatures of an emulated exothermic composite part may be replicated by calibrating the emulator 10. The emulator 10 may be calibrated by heat sink plates 16, shim plates 18, and/or exotherm plate assemblies 46 being added to or subtracted from the stacked assembly 12. For example, during a first calibration, a temperature sensor 20 may be coupled to each heat sink plate 16. Following calibration, specific locations on the stack assembly 12 (e.g., particular heat sink plates 18 or separator plates 144) may be chosen for the coupling of temperature sensors 20. Thermal modeling or other analysis may be used to determine a particular configuration of the stacked assembly 12 after the thermal profile has been identified, such that the emulator 10 may emulate or replicate the thermal inertia gradient of heating of a corresponding composite lamina part independent of part specific thermal monitoring throughout the thermal cycle of the curing process and accounting for any significant amounts of heat generated by exothermic reactions of the composite material.

Referring to FIG. 13, another example construction of the stacked assembly 12 of the emulator 10 may include an open cavity 40 defined by the plurality of adjacent cutouts 26A1, 26A2, 26A3, 26B1, 26B2, 26B3, 36, 124 of the stacked combination of heat sink plates 16, shim plates 18, and exotherm plate 120. Thermal insulation 42 (e.g., powdered insulation or air) may be provided within the cavity 40 (i.e., disposed within the heat sink cutouts 26A1, 26A2, 26A3, 26B1, 26B2, 26B3, the shim cutouts 36, the exotherm plate side cutouts 124, thus configuring the shim plates 18 filled with thermal insulation 42 into an insulator layer 44.

As illustrated in FIG. 13, at least one exotherm charge assembly 46 may be configured within the stacked assembly 12. The exotherm charge assembly 46 may be located at any position within the stacked assembly 12 and the exotherm plate 120 may be positioned adjacent to either a heat sink plate 16 or a shim plate 18 on either side depending upon the final configuration of the stacked assembly 12 based upon the thermal profile desired.

A separator plate 144 may be disposed above and below each exotherm charge assembly 46 (e.g., between the exotherm plate 120 and an adjacent heat sink plate 16 or shim plate 18). The separator plate 144 may close off at least a portion of the cavity 40 such that insulation 42 (e.g., powdered insulation) does not enter the cutout 122 of the exotherm plate 120 or interfere with the exotherm charge 52.

Thus, in an assembled stacked assembly 12, as illustrated in FIG. 13, the thermal insulation 42 disposed within cutouts 26A1, 26A2, 26A3, 26B1, 26B2, 26B3, 36 of the heat sink plates 16 and shim plates 18 may be powdered insulation and the thermal insulation 42 disposed within cutouts 124 of the exotherm plate 120 may be air.

A separator plate 144 may optionally be disposed between adjacent exotherm charge assemblies 46 (e.g., positioned between adjacent exotherm plates 120). Additionally, adjacent pairs of separator plates 144 may be optionally be separated and spaced apart by a shim plate 18 (not shown). The cutout 36 of the shim plate 18 may define a thermal gap 146 between adjacent separator plates 144. The thermal gap 146 may be filled with thermal insulation 42 (e.g., powdered insulation or air).

One skilled in the art will appreciate that varying the number of exotherm charge assemblies 46 or by varying the thickness of the exotherm charge assembly 46, an overall thicker (e.g., more plies) composite material exotherm charge 52 may be utilized.

Referring to FIGS. 6-13, the fastening apertures 22, 24, 34 (FIGS. 2-4) may be aligned when the plates 14, 16, 18 are configured into the stacked assembly 12 (FIG. 6) and may be suitably sized to receive a plurality of fasteners 38 (FIG. 6) configured to securely connect and lock the stacked assembly 12 together. The fastening apertures 22, 24, 34 may include a smooth bore or threaded bore formed entirely through the plates 14, 16, 18. The fasteners 38 may be any suitable mechanical fastener, such as those having a partially or completely threaded shaft. One skilled in the art will appreciate that the plates 14, 16, 18 may be fastened together by other method or technique to form the stacked assembly 12, including being chemically bonded, welded, or the like, without limitation.

Figure 14:
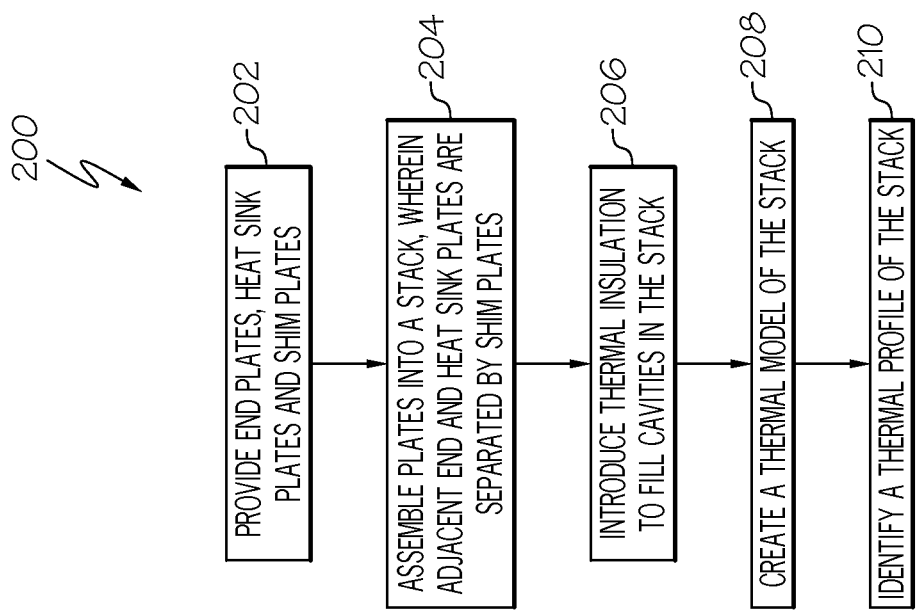
FIG. 14 is a flow chart depicting one embodiment of the disclosed method of emulating a thermal inertia gradient of a composite part.

Referring to FIG. 14, also disclosed is a method, generally designated 200, for emulating a thermal inertia gradient of a composite part. As shown at block 202, the method 200 may begin with the step of providing end plates 14, heat sink plates 16, and shim plates 18 (FIG. 6). As shown at block 204, the end plates 14, the heat sink plates 16, and the shim plates 18 may be assembled (e.g., fastened) into a stacked assembly 12 (FIG. 1). The stacked assembly 12 may define one or more open cavities 40 (FIG. 5).

As shown at block 206, thermal insulation 42 (FIG. 5) may be introduced to the stacked assembly 12 to fill (at least partially) the open cavity 40 (e.g., defined by the cutouts 26A1, 26A2, 26A3, 26B1, 26B2, 26B3, 36).

As shown at block 208, a thermal model (not shown) of the stacked assembly 12 may be created. As shown at block 210, a thermal profile (not shown) of the stacked assembly 12 may be identified.

Thus, a thermal profile of the stacked assembly 12 (FIG. 1) may be compared to a thermal profile of a composite part. A final configuration of the stacked assembly 12 (e.g., the total number, thicknesses, and stacked configuration of the heat sink plates 16 and shim plates 18) may be determined that has a thermal profile that closely matches the thermal profile of the composite part. Shim plates 18 and/or heat sink plates 16 may be added to, or subtracted from, the stacked assembly 12 based on the determined configuration and compared thermal profiles.

A temperature sensor 20 (FIG. 1) may be thermally coupled to at least one of the heat sink plates 16 of the stacked assembly 12. In an example implementation, a plurality of temperature sensors 20 may be coupled (e.g., received by the channel 30) to a plurality of heat sink plates 16. The stacked assembly 12 may be positioned in an autoclave or oven in proximity to at least one composite part having a matching thermal profile. Therefore, a thermal inertia gradient of the stacked assembly 12 may be monitored (e.g., the step of monitoring a thermal inertia gradient may be performed). Control settings (e.g., curing parameters) of the autoclave or oven curing process may be adjusted in response to the thermal inertia gradient of the stacked assembly 12 throughout a thermal cure cycle.

Figure 15:
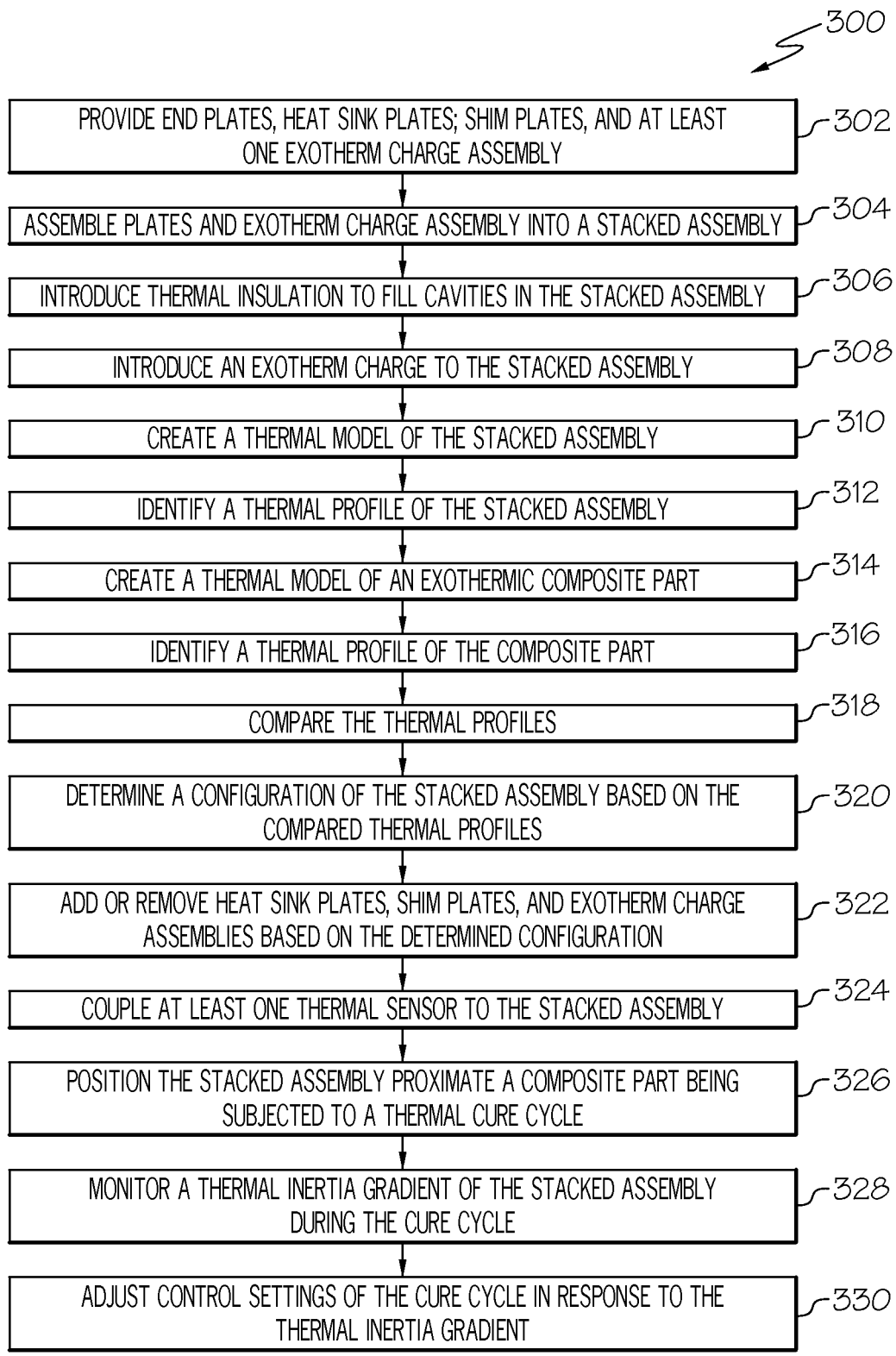
FIG. 15 is a flow chart depicting another embodiment of the disclosed method of emulating a thermal inertia gradient of a composite part.

Referring to FIG. 15, also disclosed is a method, generally designated 300, for emulating a thermal inertia gradient of an exothermic composite part. As shown at block 302, the method 300 may begin with the step of providing end plates 14, heat sink plates 16, shim plates 18, and at least one exothermic charge assembly 46 (FIG. 6).

As shown at block 304, the end plates 14, the heat sink plates 16, the shim plates 18, and at least one exotherm plate 48 may be assembled (e.g., fastened) into a stacked assembly 12 (FIG. 6). The stacked assembly 12 may define one or more open cavities 40 (FIGS. 12 and 13).

As shown at block 306, thermal insulation 42 may be introduced to the stacked assembly 12 to fill (at least partially) the open cavity 40 (e.g., defined by the cutouts 26A1, 26A2, 26A3, 26B1, 26B2, 26B3, 36, 62, 74).

As shown at block 308, an exotherm charge 52 may be introduced to the stacked assembly 12. For example, the exotherm charge 52 may be provided and coupled to the exotherm charge plate 50 and the exotherm charge plate 50 may be coupled to the exotherm plate 48 (e.g., received within the cutout 54 of the exotherm plate 48). The exothermic charge 52 (FIGS. 12 and 13) may include a composite material 98 substantially similar to a composite part to be emulated.

As shown at block 310, a thermal model (not shown) of the stacked assembly 12 may be created. As shown at block 312, a thermal profile (not shown) of the stacked assembly 12 may be identified. As shown at block 314, a thermal model (not shown) of an exothermic composite part (not shown) may be created. As shown at block 316, a thermal profile of the composite part (not shown) may be identified.

As shown at block 318, a thermal profile of the stacked assembly 12 (FIG. 6) may be compared to a thermal profile of the exothermic composite part. As shown at block 320, a final configuration of the stacked assembly 12 (e.g., the total number, thicknesses, and stacked configuration of the heat sink plates 16, shim plates 18, separator plates 144, and exotherm charge assemblies 46) may be determined having a thermal profile that closely matches the thermal profile of the exothermic composite part.

As shown at block 322, shim plates 18, heat sink plates 16, separator plates 144, and/or exotherm plate assemblies 46 may be added to, or removed from, the stacked assembly 12 based on the determined configuration and compared thermal profiles.

As shown at block 324, a temperature sensor 20 (FIG. 6) may be thermally coupled to at least one of the heat sink plates 16 of the stacked assembly 12. In an example implementation, a plurality of temperature sensors 20 may be coupled (e.g., received by the channel 30) to a plurality of heat sink plates 16 and/or may be coupled to a separator plate 144 (e.g., received by the channel 30 of a directly adjacent heat sink plate 16).

As shown at block 326, the stacked assembly 12 and temperature sensors 20 of the at least one of the disclosed emulators 10 may be positioned in proximity to at least one composite part having a matching thermal profile being subjected to a thermal cure cycle (e.g., in an autoclave or oven). As shown at block 328, the stacked assembly 12 and the composite part may be subjected to a thermal cure cycle (e.g., autoclave or oven cure).

As shown at block 330, a thermal inertia gradient of the emulator 10 may be monitored. As shown at block 332, any control settings (e.g., curing parameters) of the autoclave or oven curing process may be adjusted in response to the thermal inertia gradient of the disclosed emulator 10 throughout a thermal cure cycle.

Although various embodiments of the disclosed temperature emulator have been shown and described, modifications may occur to those skilled in the art upon reading the specification. The present application includes such modifications and is limited only by the scope of the claims.

What is claimed is:

1. A temperature emulator comprising:
a plurality of thermally conductive plates configured in a stacked assembly, wherein said plurality of thermally conductive plates define an open cavity in said stacked assembly; and
an exotherm charge disposed between at least one adjacent pair of thermally conductive plates of said plurality of thermally conductive plates.

2. The temperature emulator of claim 1 further comprising at least one temperature sensor thermally coupled to said stacked assembly.

3. The temperature emulator of claim 1 wherein said exotherm charge comprises an uncured composite material.

4. The temperature emulator of claim 1 wherein thermal insulation is disposed within said cavity.

5. The temperature emulator of claim 1 wherein said plurality of thermally conductive plates comprises:
a pair of end plates positioned at an uppermost and a lowermost location of said stacked assembly;
a plurality of heat sink plates positioned between said pair of end plates; and
at least one exotherm charge assembly positioned between at least one pair of adjacent heat sink plates.

6. The temperature emulator of claim 5 wherein each of said plurality of heat sink plates comprises a plurality of cutouts and a center portion, wherein said plurality of cutouts are filled with thermal insulation.

7. The temperature emulator of claim 5 wherein said plurality of thermally conductive plates further comprises a plurality of shim plates disposed between adjacent pairs of heat sink plates, each shim plate comprising a cutout filled with thermal insulation.

8. The temperature emulator of claim 5 wherein said exotherm charge assembly comprises:
an exotherm plate comprising a cutout; and
an exotherm charge plate received by said exotherm plate cutout, said exotherm charge plate comprising a cutout configured to receive said exotherm charge.

9. A temperature emulator comprising:
a stacked assembly comprising:
a pair of end plates positioned at an uppermost and lowermost location of said stacked assembly;
a plurality of heat sink plates positioned between said pair of end plates;
a plurality of shim plates positioned between adjacent pairs of heat sink plates; and
an exothermic charge assembly positioned between at least one pair of heat sink plates, said exothermic charge assembly comprising an exotherm charge configured to react exothermally in response to a thermal cure cycle.

10. The temperature emulator of claim 9 wherein said exotherm charge comprises a composite material.

11. The temperature emulator of claim 10 wherein:
each of said heat sink plates comprises a plurality of heat sink cutouts;
each of said shim plates comprises a shim cutout;
said shim cutouts and said heat sink cutouts define an open cavity in said stacked assembly; and
thermal insulation is disposed within said open cavity.

12. The temperature emulator of claim 11 further comprising at least one temperature sensor coupled to said stacked assembly.

13. The temperature emulator of claim 12 wherein said exotherm charge assembly comprises:
an exotherm plate comprising a cutout; and
an exotherm charge plate received by said exotherm plate cutout, said exotherm charge plate comprising a cutout configured to receive said exotherm charge.

14. The temperature emulator of claim 13 wherein said thermal insulation comprises powder insulation.

15. The temperature emulator of claim 13 wherein said thermal insulation comprises air.

16. A method of emulating a thermal inertia gradient of an exothermic composite part, said method comprising the steps of:
providing a pair of end plates, a plurality of heat sink plates each comprising a plurality of heat sink cutouts, a plurality of shim plates each comprising a shim cutout, and at least one exotherm charge assembly;
assembling said end plates, said heat sink plates, said shim plates, and said exotherm charge assembly into a stacked assembly, wherein adjacent pairs of heat sink plates are separated by at least one shim plate such that a plurality of adjacent heat sink cutouts and shim cutouts form a cavity;
introducing thermal insulation within said cavity;
introducing an exotherm charge to said exotherm charge assembly;
creating a thermal model of said stacked assembly; and
identifying a thermal profile of said stacked assembly.

17. The method of claim 16 further comprising the steps of:
identifying a thermal profile of a composite part;
comparing said thermal profile of said stack assembly to said thermal profile of said composite part;
determining a configuration of said stacked assembly having a thermal profile matching said thermal profile of said composite part;
adding shim plates to or removing shim plates from said stacked assembly based on said configuration;
adding heat sink plates to or removing heat sink plates from said stack assembly based on said configuration; and
adding exotherm charge assemblies to or removing exotherm charge assemblies from said stacked assembly based on said configuration.

18. The method of claim 17 further comprising the steps of:
coupling at least one temperature sensor to said stacked assembly;
positioning said stacked assembly with at least one temperature sensor proximate to at least one composite part having a matching thermal profile;
subjecting said stacked assembly and said composite part to a thermal cure cycle; and,
monitoring a thermal inertia gradient of said stacked assembly.

19. The method of claim 18 further comprising the step of adjusting control settings of said thermal cure cycle in response to said thermal inertia gradient of said stacked assembly.

20. A temperature emulator comprising:
a plurality of thermally conductive plates configured in a stacked assembly, wherein said plurality of thermally conductive plates comprises:
a pair of end plates positioned at an uppermost and a lowermost location of said stacked assembly;
a plurality of heat sink plates positioned between said pair of end plates; and
at least one exotherm charge assembly positioned between at least one pair of adjacent heat sink plates, said exothermic charge assembly comprising an exotherm charge.

21. The temperature emulator of claim 20 wherein each of said plurality of heat sink plates comprises a plurality of cutouts and a center portion, wherein said plurality of cutouts are filled with thermal insulation.

22. The temperature emulator of claim 20 wherein said plurality of thermally conductive plates further comprises a plurality of shim plates disposed between adjacent pairs of heat sink plates, each shim plate comprising a cutout filled with thermal insulation.

23. The temperature emulator of claim 20 wherein said exotherm charge assembly comprises:
an exotherm plate comprising a cutout; and
an exotherm charge plate received by said exotherm plate cutout, said exotherm charge plate comprising a cutout configured to receive said exotherm charge.

* * * * *